US012763841B2

(12) United States Patent
Elgaard et al.

(10) Patent No.: US 12,763,841 B2
(45) Date of Patent: Oct. 13, 2026

(54) RECEIVER BEAMFORMING

(71) Applicant: Telefonaktiebolaget LM Ericsson (publ), Stockholm (SE)

(72) Inventors: Christian Elgaard, Lund (SE); Reda Kasri, Malmö (SE); Fabien Mesquita, Limhamn (SE); Henrik Sjöland, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/860,977

(22) PCT Filed: Apr. 29, 2022

(86) PCT No.: PCT/EP2022/061495
§ 371 (c)(1),
(2) Date: Oct. 28, 2024

(87) PCT Pub. No.: WO2023/208362
PCT Pub. Date: Nov. 1, 2023

(65) Prior Publication Data
US 2025/0293757 A1 Sep. 18, 2025

(51) Int. Cl.
*H04B 7/08* (2006.01)

(52) U.S. Cl.
CPC .................................. *H04B 7/0868* (2013.01)

(58) Field of Classification Search
CPC .................................................... H04B 7/0868
See application file for complete search history.

(56) References Cited

U.S. PATENT DOCUMENTS

2015/0325913 A1* 11/2015 Vagman .................. H01Q 3/34 342/368
2018/0076520 A1* 3/2018 Ma ........................... H01Q 3/36
(Continued)

FOREIGN PATENT DOCUMENTS

WO 2021121634 A1 6/2021
WO 2021155041 A1 8/2021

OTHER PUBLICATIONS

International Search Report and Written Opinion dated Dec. 5, 2022 for International Application No. PCT/EP2022/061495 filed Apr. 29, 2022, consisting of 14 pages.

*Primary Examiner* — Janice N Tieu
(74) *Attorney, Agent, or Firm* — Weisberg I.P. Law, P.A.

(57) ABSTRACT

A method for receiver beamforming is provided. The method includes receiving wireless transmissions from multiple transmitters at each of a plurality of antenna elements. The wireless transmissions include a respective identical copy of an information stream. The method further includes phase-shifting, for each antenna element, the received antenna signals in relation to multiple beam directions, thereby providing phase-shifted antenna signals for two or more of the multiple transmitters. The method further includes combining, for the two or more of the multiple transmitters, the phase-shifted antenna signals thereby providing a received beam signals for each of the two or more of the multiple transmitters. The method further includes synchronizing the received beam signals with regards to a time and/or a phase difference between the received beam signals and combining the received beam signals thereby providing a combined receive signal.

18 Claims, 8 Drawing Sheets

(56) References Cited

U.S. PATENT DOCUMENTS

| | | | | |
|---|---|---|---|---|
| 2019/0089434 | A1* | 3/2019 | Rainish | H04B 7/086 |
| 2022/0232329 | A1* | 7/2022 | Shriner | H04R 25/02 |
| 2023/0179446 | A1* | 6/2023 | Uehashi | H04L 25/0222<br>375/262 |

* cited by examiner

RECEIVER BEAMFORMING

CROSS-REFERENCE TO RELATED APPLICATION

This application is a Submission Under 35 U.S.C. § 371 for U.S. National Stage Patent Application of International Application Number: PCT/EP2022/061495, filed Apr. 29, 2022 entitled "RECEIVER BEAMFORMING," the entirety of which is incorporated herein by reference.

TECHNICAL FIELD

The present disclosure relates to wireless communication and more precisely to a receiver beamforming.

BACKGROUND

The range of a transmitted wireless signal is a recurring challenge in wireless communication. In order for a signal to be successfully received by a receiving entity, the signal has to be strong enough in relation to a noise in a received bandwidth. Generally, a signal to noise ratio (SNR) threshold may be defined for a receiving entity below which reception of the signal will cause a Bit Error Rate (BER) to be above a sensitivity threshold. The SNR threshold will differ depending on factors such as modulation of the transmitted wireless signal and receiver design at the receiving entity.

The received SNR may commonly be increased by decreasing the bitrate of the transmitted wireless signal, effectively increasing the energy of each bit in the wireless transmission. Alternatively or additionally, the received SNR may be increased by increasing the power of the transmitted wireless signal. However, legal limitations (e.g. ETSI and FCC requirements) and challenges in transmitter design typically limit the maximum transmit power.

With the advent of distributed multiple input multiple output (DMIMO) networks, collaborative transmissions from multiple transmitters are introduced. The DMIMO technology relies on synchronization of transmission at the transmitting entities to ensure coherent combination of the transmitted signals at the receiving entity. The complexity of the transmitter synchronization becomes more cumbersome when the number of transmitting entities increase, and/or when multipath handling becomes more complex, and/or when the receiving entities are moving. In some scenarios, the complexity of the transmitter synchronization may become close to unsurmountable.

SUMMARY

It is in view of the above considerations and others that the various embodiments of this disclosure have been made. The present disclosure therefor recognizes the fact that there is a need for alternatives to (e.g. improvement of) the existing art described above.

It is an object of some embodiments to solve, mitigate, alleviate, or eliminate at least some of the above or other disadvantages.

An object of the present disclosure is to provide a new type of receiver which is improved over prior art and which eliminates or at least mitigates the drawbacks discussed above. More specifically, an object of the invention is to provide a method and a device that is capable of performing receiver beamforming to coherently combine signals from different transmission points. These objects are achieved by the technique set forth in the appended independent claims with preferred embodiments defined in the dependent claims related thereto.

In a first aspect a method for receiver beamforming is provided. The method comprises receiving wireless transmissions from multiple transmitters at each of a plurality of antenna elements. The wireless transmissions comprise a respective identical copy of an information stream. The method further comprises phase-shifting, for each antenna element, the received antenna signals in relation to multiple beam directions, thereby providing phase-shifted antenna signals for two or more of the multiple transmitters. The method further comprises combining, for the two or more of the multiple transmitters, the phase-shifted antenna signals thereby providing a received beam signal for each of the two or more of the multiple transmitters. The method further comprises synchronizing the received beam signals with regards to a time and/or a phase difference between the received beam signals and combining the synchronized received beam signals, thereby providing a combined receive signal.

In one variant, each of the multiple directions corresponds to a predetermined or configurable phase-shift and the phase-shifting comprises phase rotating the received antenna signals by the predetermined or configurable phase-shift. This is efficient as the predetermined or configurable phase-shift allows for accurate and controllable beamforming.

In one variant, the phase-shift is a configurable phase-shift and the phase-shifting further comprises beam scanning to determine the configurable phase-shift. This is beneficial as this ensures that the strongest signal is utilized.

In one variant, the wireless transmissions comprises a synchronization signal and the combining of the received beam signals further comprises detecting the synchronization signal. Further to this, the synchronizing of the received beam signals is performed based on the detected synchronization signal. This is beneficial as it provides an accurate synchronization with low risk of errors.

In one variant, receiving of the wireless transmissions further comprises, for each of the antenna element, converting the received antenna signals into a corresponding digital representation of the received antenna signals. This is beneficial as e.g. phase-shifting in the digital domain is a matter of a rotation in the I-Q plane.

In one variant, the method further comprises determining a receive signal SNR of the combined receive signal for subsequent provision. This is beneficial as it allows e.g. a wireless system and/or an apparatus to react and adapt to the receive signal SNR.

In one variant, the combining the received beam signals further comprises determining a transmitter SNR of each of the received beam signals for subsequent provision. This is beneficial as it allows e.g. a wireless system and/or an apparatus to react and adapt to the transmitter SNR.

In one variant, combining the received beam signals further comprises, responsive to the transmitter SNR being below a transmitter SNR threshold for one or more of the received beam signals, omitting that one or more of the received beam signals from the combined receive signal. This is beneficial as it reduces a risk of the low-SNR received beam signals adversely affecting the combined receive signal.

In one variant, combining the received beam signals comprises a weighted combining of the received beam signals. The weighted combining comprises, responsive to the transmitter SNR being below a transmitter SNR threshold for one or more of the received beam signals, decreasing a weight of that one or more of the received beam signals in the weighted combination.

In a second aspect, a receiver is presented. The receiver comprises a plurality of receiver arrangements each configured for connection to one respective antenna element of a plurality of antenna elements, a first combiner and a second combiner. The receiver is configurable to receive wireless transmissions from multiple transmitters at each of the plurality of antenna elements. The wireless transmissions comprise a respective identical copy of an information stream. Each receiver arrangement of the plurality of receiver arrangements comprises a phase-shift arrangement configurable to phase-shift the received antenna signals in relation to multiple beam directions, thereby providing phase-shifted antenna signals for two or more of the multiple transmitters. The first combiner is configurable to combine, for the two or more of the multiple transmitters, the phase-shifted antenna signals, thereby providing a received beam signal for each of the two or more of the multiple transmitters. The second combiner comprises a synchronizer configurable to synchronize the received beam signals with regards to a time and a phase difference between the received beam signals and the second combiner is configurable to combine the received beam signals, thereby providing a combined receive signal.

In one variant, each of the multiple beam directions corresponds to a predetermined or configurable phase-shift and the phase-shift arrangement is further configurable to phase rotate the received antenna signals with the predetermined or configurable phase-shift. This is efficient as the predetermined or configurable phase-shift allows for accurate and controllable beamforming.

In one variant, the phase-shift is a configurable phase-shift and the phase-shift arrangement is further configurable to perform beam scanning to determine the configurable phase-shift. This is beneficial as this ensures that the strongest signal is utilized.

In one variant, the wireless transmissions comprises a synchronization signal and the synchronizer is further configurable to detect the synchronization signal and synchronize the received beam signals based on the detected synchronization signal. This is beneficial as it provides an accurate synchronization with low risk of errors.

On one variant, each receiver arrangement of the plurality of receiver arrangements further comprises an analog to digital converter, ADC, configurable to convert the received antenna signals into a corresponding digital representation of the received antenna signals. This is beneficial as e.g. phase-shifting in the digital domain is a matter of a rotation in the I-Q plane.

In one variant, the receiver further comprises a receive signal SNR device configurable to determine a receive signal SNR of the combined receive signal for subsequent communication. This is beneficial as the receive signal SNR will provide information of how well the combining of the wireless transmissions work and allow for reconfiguration of the transmitter and/or the receiver.

In one variant, the second combiner is further configured to determine a transmitter SNR of each of the received beam signals for subsequent communication. This is beneficial as it allows for the pinpointing of a SNR associated with each transmitter after combining and allow for reconfiguration of the transmitter and/or the receiver.

In one variant, the second combiner is further configured to, responsive to the transmitter SNR being below a transmitter SNR threshold, omit that one or more of the received beam signals from the combined receive signal. This is beneficial as it allows for e.g. the removal of signals that will not increase the SNR of the combined receive signal.

In one variant, the second combiner is further configured to perform a weighted combining of the received beam signals of the received beam signals. Responsive to the transmitter SNR being below a transmitter SNR threshold for one or more of the received beam signals, the second combiner is configured to decrease a weight of that one or more of the received beam signals in the weighted combination.

In a third aspect, an apparatus comprising the receiver according to the second aspect is presented.

In one variant, the apparatus further comprises the plurality of antenna elements.

In one variant, the apparatus is a wireless device.

In one variant, the apparatus is a network node.

In a fourth aspect, an integrated circuit (IC) comprising the receiver of the second aspect is presented.

In a fifth aspect, a data processing unit is presented. The data processing unit is operatively connected to a plurality of receiver arrangement each connected to one respective antenna element of a plurality of antenna elements. The data processing unit is further operatively connected to a first combiner and a second combiner. The data processing unit is configured to cause, receiving of wireless transmissions from multiple transmitters at each of the plurality of antenna elements, wherein the wireless transmissions comprise a respective identical copy of an information stream. The data processing unit is further configured to cause phase-shifting of, for each antenna element, the received antenna signals in relation to multiple beam directions, thereby causing provision of phase-shifted antenna signals for two or more of the multiple transmitters. Further to this, the data processing unit is configured to cause combining of, for the two or more of the multiple transmitters, the phase-shifted antenna signals, thereby causing provision of a received beam signal for each of the two or more of the multiple transmitters. In addition to this, the data processing unit is configured to cause synchronizing of the received beam signals with regards to a time and/or a phase difference between the received beam signals and combining of the received beam signals, thereby causing provision of a combined receive signal.

In one variant, the data processing unit is further configured to cause the execution of the method according to the first aspect.

In a sixth aspect, a computer program product is presented. The computer program product comprises a non-transitory computer readable medium, having thereon a computer program comprising program instructions. The computer program being loadable into a data processing unit and configured to cause execution of the method according to the first aspect when the computer program is run by the data processing unit.

In one variant, the non-transitory computer readable medium is one of an electronic signal, an optical signal, a radio signal, or a computer readable storage medium.

In a seventh aspect, a wireless system is presented. The wireless system comprises a plurality of transmitters, a system controller and an apparatus according to the third aspect. The system controller is operable to receive an indication of a receive signal SNR from the apparatus and, responsive to the receive signal SNR being below a lower receive signal SNR threshold, configure two or more of the plurality of transmitters to operate in a long range mode wherein each of the two or more of the plurality of transmitters transmit wireless transmissions comprising a respective identical copy of an information stream to the apparatus.

In one variant, the system controller is operable to, responsive to the receive signal SNR being above an upper receive signal SNR threshold being greater than the lower receive signal SNR threshold, configure two or more of the plurality of transmitters to operate in a short range mode wherein each of the two or more of the plurality of transmitters transmit wireless transmissions comprising respective different information streams to the apparatus. This is beneficial as it allows for dynamic transmission scenarios focused either on throughput or range. In one variant, the system controller is operable to receive, from the apparatus, a transmitter SNR associated with one or more of the plurality of transmitters. Responsive to the transmitter SNR being below a transmitter SNR threshold, configure that one or more of the plurality of transmitters to stop transmitting the wireless transmission comprising a respective identical copy of an information stream to the apparatus. This is beneficial as it allows for closed loop control of the number of transmitters used and transmitters that do not add to the receive signal SNR may be turned off to save power, spectrum etc.

In one variant, the wireless system is a distributed multiple input multiple output (DMIMO) network.

In some embodiments, any of the above aspects may additionally have features and/or benefits identical with, or corresponding to, any of the various features and/or benefits as explained above for any of the other aspects.

BRIEF DESCRIPTION OF THE DRAWINGS

These and other aspects, features and advantages will be apparent and elucidated from the following description of various embodiments; references being made to the appended diagrammatical drawings which illustrate non-limiting examples of how the concept can be reduced into practice.

DETAILED DESCRIPTION

Figure 1:
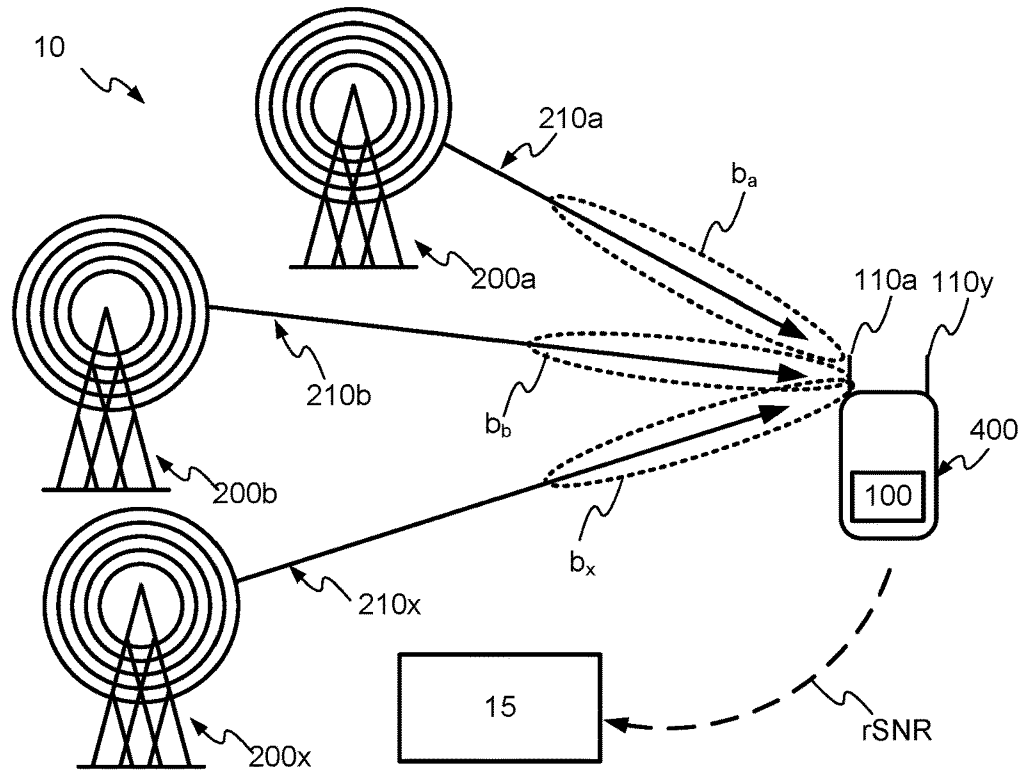
FIG. 1 is a schematic view of a wireless system according to some embodiments of the present disclosure.

Hereinafter, certain embodiments will be described more fully with reference to the accompanying drawings. The invention described throughout this disclosure may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

The term "coupled" is defined as connected, although not necessarily directly, and not necessarily mechanically. Two or more items that are "coupled" may be integral with each other. The terms "a" and "an" are defined as one or more unless this disclosure explicitly requires otherwise. The terms "substantially," "approximately," and "about" are defined as largely, but not necessarily wholly what is specified, as understood by a person of ordinary skill in the art. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method that "comprises," "has," "includes" or "contains" one or more steps possesses those one or more steps, but is not limited to possessing only those one or more steps.

Throughout the present disclosure, specific embodiments, examples and features are presented with reference to distributed multiple input multiple output (DMIMO) networks (also known as cell-free massive MIMO). These references are provided to better convey and illustrate the benefits of the teachings herein, but are not to be considered limiting. The teachings herein are applicable to any suitable receiver having more than one antenna element substantially regardless of technology, architecture or other system parameters.

A DMIMO network rely on a large number of service devices per unit area, also called Access Point (APs), serving simultaneously a number of User Equipment (UEs). In a typical DMIMO deployment, APs are interconnected and configured to cooperate in serving the UEs, i.e. one or several APs may be cooperatively transmitting data to and receiving data from respective UE. This kind of dense deployment allows the network owner to maximize service level in terms of capacity, throughput, reliability, and energy efficiency. It also incorporates features from cellular Massive MIMO, such as favorable propagation, channel hardening etc. However, implementation of a DMIMO network still suffer from practical limitations, such as stringent synchronization requirements on the APs and the need to handle multipath propagation at the receiver (receiving a signal by two or more paths). In a DMIMO network, the APs coherently combine signals for a selected UE, hence requiring very tight synchronization between the APs. This requirement on synchronization is dependent on several factors, one being carrier frequency, and is difficult to achieve in a comparably low frequency range (e.g. below 6 GHz) and is unrealistic at a comparably high frequency range, e.g. millimeter Wave (mmW). Therefore, most DMIMO implementations are limited to APs having a beamforming capability, but without coherent transmission between the APs. Cooperative Multi-Point (COMP) is introduced to improve communication at cell-edge. In COMP, APs are synchronized and transmit data coherently in order to improve the access link on the cell-edge. However, the implementation of this technology in a large cellular network brings many practical challenges, especially on the synchronization requirements, computational complexity and clustering size.

To exemplify, state of the art communications networks discussed within the 3rd Generation Partnership Project (3GPP) plan to employ multiple transmission points (multi-TRP) e.g. simultaneously transmitting the same signal to a device to increase the signal to noise ratio. The modulation planned for multi-TRP is OFDM, which means that, if the transmitted signals are within a cyclic prefix from each other, the information can be retrieved by a Fast Fourier Transform (FFT). That is to say, the signals received by an antenna will add non-coherently. Non-coherent addition will result in lower performance increase (e.g. lower increase in SNR) than coherent addition. If the signals are not phase aligned, then a time delay between a signal arriving from a first transmission point to a signal arriving from a last transmission point must not be more than one cyclic prefix. If that time is exceeded, there is a large risk for errors in the reception. At frequencies above 52 GHz, currently in standardization, the cyclic prefix is just 70 ns long. That 70 ns should absorb time synchronization errors between transmission points, differences in propagation time from transmission points to the receiver, as well as channel delay spread. In Multicast-broadcast single-frequency network (MBSFN) for LTE, the cyclic prefix is extended to handle similar issues, but extending the cyclic prefix length comes at the cost of reduced system capacity. It should also be mentioned that presently existing stricter time synchronization accuracy requirements between transmission points are related to collocated deployments. Regarding coherent combination of signals from different transmission points, at mm-wave frequencies, it is not practically feasible to ensure that the signals reach the receiver in phase-due to e.g. physical movements and clock frequency errors.

The inventors behind the present disclosure have realized that it is possible to shift some of the challenges related to coherent transmissions to the receiving entity.

With reference to FIG. 1, a wireless system 10 usable with the teachings of the present disclosure will be presented. The wireless system 10 comprising a plurality of transmitters 200*a*, 200*b*, . . . , 200*x*. These transmitters may be network nodes, access points, base stations etc. The wireless system 10 further comprises a system controller 15 configured to control the operation, the synchronization and/or the interconnection of the transmitters 200*a*, 200*b*, . . . , 200*x*. The system controller 15 may be a stand-alone device, comprised in (distributed between) one or more of the transmitters 200*a*, 200*b*, . . . , 200*x* or distributed between a stand-alone device and one or more of the transmitters 200*a*, 200*b*, . . . , 200*x*. The wireless system 10 further comprises an apparatus 400, as will be further detailed elsewhere in the present disclosure, configured to receive wireless transmissions 210*a*, 210*b*, . . . , 210*x* from the transmitters 200*a*, 200*b*, . . . , 200*x*. Each transmitter of the transmitters 200*a*, 200*b*, . . . , 200*x* transmits one wireless transmissions 210*a*, 210*b*, . . . , 210*x* and the apparatus 400 may be configured to receive each wireless transmission on one beam direction $b_a$, $b_b$, . . . , $b_x$. Preferably, the apparatus 400 is configured to, as will be taught elsewhere in this disclosure, to receive each wireless transmission 210*a*, 210*b*, 210*x* in one of multiple beam directions $b_a$, $b_b$, . . . , $b_x$. The system controller 15 is operable to receive an indication of a receive signal Signal to Noise Ratio rSNR from the apparatus 400. The indication of the receive signal SNR rSNR may be received by one of more of the transmitters 200*a*, 200*b*, . . . , 200*x* and relayed to the controller 15, or communicated from the apparatus 400 to the controller 15 in any suitable way. The indication of the receive signal SNR rSNR comprises an indication for the system controller 15 to determine at least a range of an SNR of one or more of the wireless transmissions 210*a*, 210*b*, . . . , 210*x* received by the apparatus 400. The indication may be e.g. an actual measure of the received SNR or a metric indicating or referencing a range of received SNR. The multiple transmitters 200*a*, 200*b*, . . . , 200*x* may each be configured to transmit wireless transmissions 210*a*, 210*b*, . . . , 210*x* to the apparatus comprising identical information streams 201 (see FIG. 2). That is to say, although each of the wireless transmissions 210*a*, 210*b*, . . . , 210*x* may be different, they all have a common component in the identical information stream 201. The identical information stream 201 is a data stream 201 to be received by the apparatus 400 and as it is transmitted by more than one transmitter 200*a*, 200*b*, . . . , 200*x*, the apparatus 400 according to the present disclosure is operable to combine the identical information streams 201 of each of the wireless transmissions 210*a*, 210*b*, . . . , 210*x* to increase the received signal strength of the identical information streams 201.

It should be mentioned that, although the present disclosure is focused on the reception of signals, information will, in some embodiments, have to be communicated from the receiving entity. This implies that the receiving entity comprises or is operatively connected to a transmitting entity. These are not further detailed herein and the skilled person will understand how to accomplish communication of such information.

Figure 2:
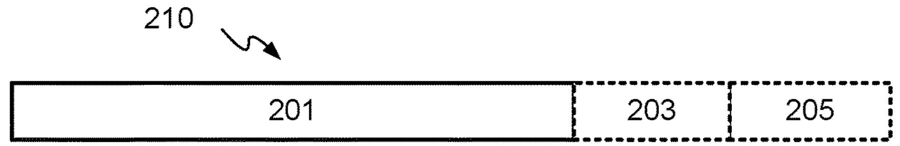
FIG. 2 is a schematic view of a wireless transmission according to some embodiments of the present disclosure.

With reference to FIG. 2, one exemplary embodiment of a packet structure of a general wireless transmission 210 according to the present disclosure will be explained. The wireless transmission 210 comprises an information stream 201. Preferably, the information stream 201 of the wireless transmission 210 is the information stream 201 that is identical in each of the wireless transmissions 210*a*, 210*b*, . . . , 210*x* configured to form part of the multi-TRP setup illustrated in FIG. 1. It should be emphasized that each of the wireless transmissions 210*a*, 210*b*, . . . , 210*x* comprise an identical copy of the information stream 201. The information stream 201 may be any information stream 201 for the apparatus 400, it may be data requested by the apparatus 400 or it may be system information or system messages pushed to the apparatus 400. In addition to the information stream 201, the wireless transmission 210 may comprise a synchronization signal 203 allowing the apparatus to synchronize a phase and time of the wireless transmission 210 when it is received. The synchronization signal 203 may be any suitable synchronization and/or synchronization pattern known in the art provided to enable the apparatus 400 to combine the identical information stream from the different transmitters 200*a*, 200*b*, . . . , 200*x* coherently. The wireless transmission 210 may further comprise an identifier 205 indicating the particular transmitter 200*a*, 200*b*, . . . , 200*x* from which the wireless transmission originated.

It should be mentioned that the wireless transmission 210 is not necessarily transmitted in the order indicated in FIG. 2. In some embodiment, all or some of the parts 201, 203, 205 of the wireless transmission 210 are transmitted simultaneously by the associated transmitter 200*a*, 200*b*, . . . , 200*x*. In some embodiments, the wireless transmission 210 may be formed by a plurality of transmissions such that a guard interval, silent period or other is introduced between the parts 201, 203, 205 of the wireless transmission 210. The synchronization signal 203 may be transmitted before the information stream 201, so that proper delays and phase rotation can be set up before the data arrives. However, it is also possible to buffer the wireless transmission 210, (or at least the information stream 201) and process it when the synchronization signal 203 has been received. In such cases, the synchronization signal 205 may be transmitted after or in the middle of the wireless transmission 210. In some embodiments, not all synchronization signals 203 are the same. That is to say, some wireless transmissions 210 may be transmitted with only the information stream 201 and thereby saving resources.

Figure 3:
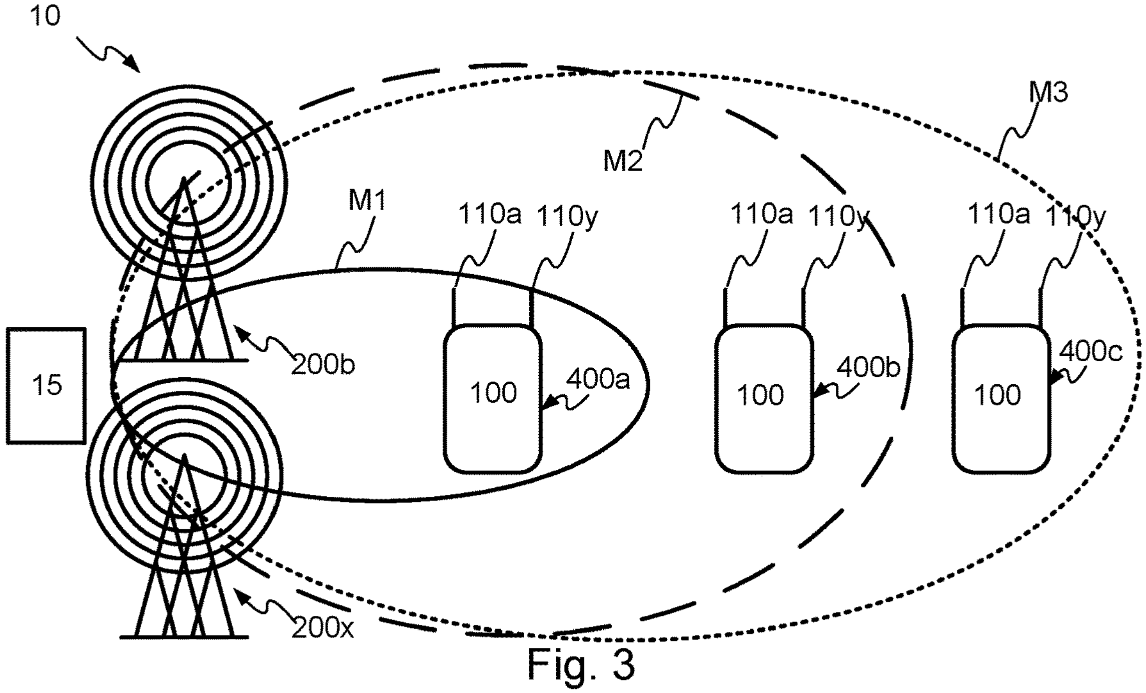
FIG. 3 is a schematic view of a wireless system according to some embodiments of the present disclosure.

The wireless system 10, may in some embodiments be configured to change transmission mode depending on the receive signal SNR rSNR. This is schematically illustrated in FIG. 3 wherein the wireless system 10 is exemplified with two transmitters 200*a*, 200*b* but the skilled person will appreciate that any plurality of transmitters is workable with the teachings herein. Assume an initial scenario wherein both transmitters 200*a*, 200*b* transmit to all apparatuses 400*a*, 400*b*, 400*c* in the wireless system 10 using the same transmission mode. A first apparatus 400*a* is located comparably close to the transmitters 200*a*, 200*b*, i.e. closer to the transmitters 200*a*, 200*b* than a second apparatus 400*b*. In one example, the first apparatus 400*a* is located 10 m closer to the transmitters 200*a*, 200*b* than the second apparatus 400*b*. A total path loss from the transmitters 200*a*, 200*b* to the first apparatus 400*a* is lower than a corresponding path loss from the transmitters 200*a*, 200*b* to the second apparatus 400*b*. Consequently, in the initial scenario, the receive signal SNR rSNR at the first apparatus 400*a* is above an upper receive signal SNR threshold. Responsive to the receive signal SNR rSNR from the first apparatus 400*a* being above the upper receive signal SNR threshold, the system controller 15 may configure the transmitters 200*a*, 200*b* to operate in a short range mode M1 when communicating with the first apparatus 400*a*. The short range mode M1 may comprise each transmitter 200*a*, 200*b* transmitting different information streams to the first apparatus 400*a*. The different information streams may be transmitted with an increased bandwidth and/or bitrate such that a throughput when communicating in the short range mode M1 is further increased (compared to the other modes of communication described herein). A third apparatus 400*c* is located comparably far away from the transmitters 200*a*, 200*b*, i.e. further from the transmitters 200*a*, 200*b* than the second apparatus 400*b*. In one example, the third apparatus 400*c* is located 10 m further away from the transmitters 200*a*, 200*b* than the second apparatus 400*b*. A total path loss from the transmitters 200*a*, 200*b* to the third apparatus 400*c* is comparably high, i.e. higher than a corresponding path loss from the transmitters 200*a*, 200*b* to the second apparatus 400*b*. Consequently, in the initial scenario, the receive signal SNR rSNR at the third apparatus 400*c* is below a lower receive signal SNR threshold. The lower receive signal SNR threshold being lower (below, smaller) than or equal to the upper receive signal SNR threshold. Responsive to the receive signal SNR rSNR from the third apparatus 400*c* being below the lower receive signal SNR threshold, the system controller 15 may configure the transmitters 200*a*, 200*b* to operate in a long range mode M3 when communicating with the third apparatus 400*c*. The long range mode M3 may comprise each transmitter 200*a*, 200*b* transmitting wireless transmissions 210*a*, 210*b*, . . . , 210*x* comprising respective identical copies of the information stream 201 to the third apparatus 400*c*. In the long range mode M3, the wireless transmissions 210*a*, 210*b*, . . . , 210*x* may be configured with a reduced bandwidth and/or bitrate such that an energy per bit of the information stream 201 is further increased (compared to the other modes of communication described herein).

In some embodiments, the lower receive signal SNR threshold is equal to the upper receive signal SNR threshold, and in other embodiments, the lower receive signal SNR threshold is below the upper receive signal SNR threshold. In the latter embodiments, the wireless system 10 may be configurable to communicate in an intermediate range mode M2. In FIG. 3 a second apparatus 400*b* is located at an intermediate distance from the transmitters 200*a*, 200*b*. The intermediate range mode M2 may be a combination or interpolation of features from the short range mode M1 and the long range mode M3. Consequently, the total path loss from the transmitters 200*a*, 200*b* to the second apparatus 400*b* is between the total path losses to the first apparatus 200*a* and the third apparatus 200*c*. Analogously, the receive signal SNR rSNR at the second apparatus 400*b* is below the upper receive signal SNR threshold and above the lower receive signal SNR threshold. Responsive to the receive signal SNR rSNR from the second apparatus 400*b* being in this range, the system controller 15 may configure the transmitters 200*a*, 200*b* to operate in the intermediate range mode M2 when communicating with the second apparatus 400*b*.

The example illustrated in FIG. 3 comprised three apparatuses 400*a*, 400*b*, 400*c* but the wireless system 10 may comprise any number of apparatuses 400. The wireless system 10 is preferably dynamic such that the communication mode M1, M2, M3 is adapted to a current receive signal SNR rSNR at the apparatus 400. The receive signal SNR rSNR may change due to the apparatus 400 moving and/or changes in the load of the transmitters 200*a*, 200*b*. The more active apparatuses 400 in the wireless system 10, the higher the risk for noise and interference causing reduced receive signal SNR rSNR at the apparatus 400.

As explained, in the long range mode M3, a plurality of transmitters 200*a*, 200*b*, . . . , 200*x* transmit respective wireless transmissions 210*a*, 210*b*, . . . , 210*x*, each comprising a respective identical copy of an information stream 201. The inventors behind the present disclosure have realized that, by configuring the apparatus 400 with a receiver 100 (see FIG. 4) as taught in the following, the complexity of successfully combining the respective identical copies of the information stream 201 may be moved to the apparatus 400, or at least shared between the apparatus 400 and a backend (the system controller 15, the transmitters 200*a*, 200*b*, . . . , 200*x* etc.)

of the wireless system 10.

Figure 4:
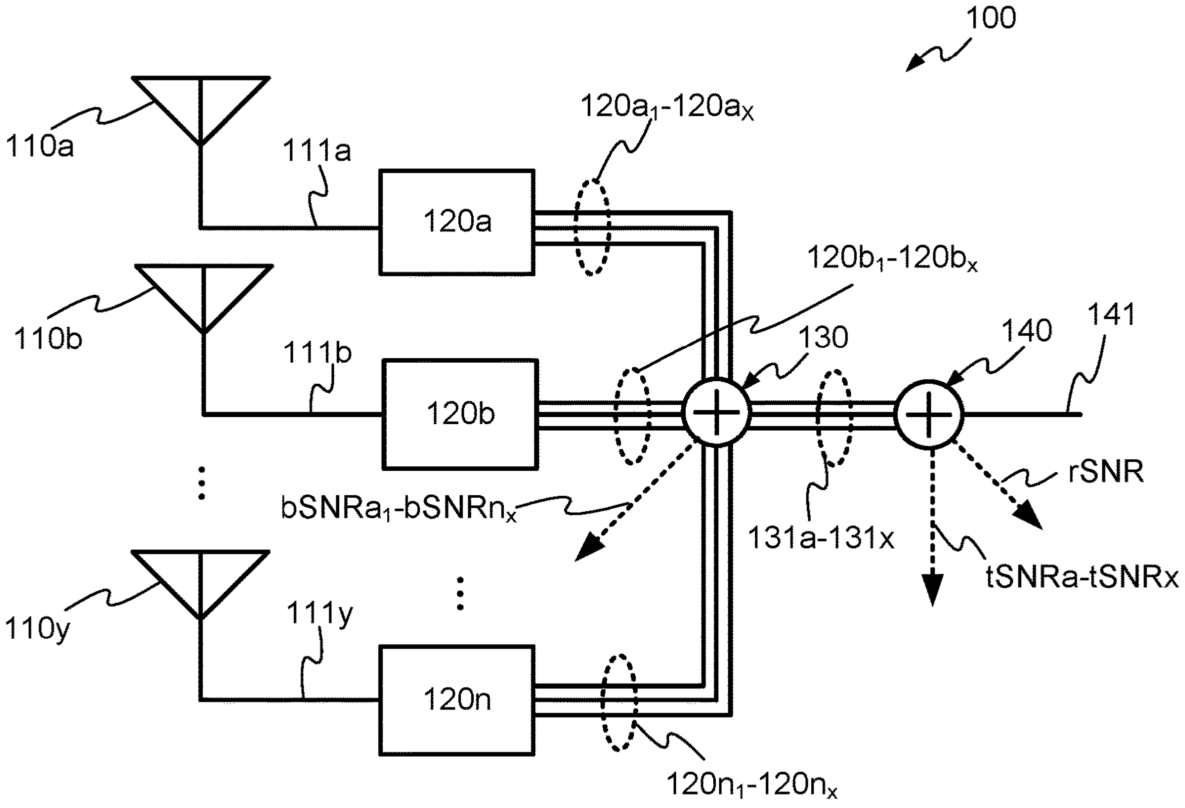
FIG. 4 is a schematic view of a receiver according to some embodiments of the present disclosure.

With reference to FIG. 4, a receiver 100 usable with e.g. the apparatus 400 of the wireless system 10 of above will be described. The receiver 100 comprises a plurality of receiver arrangements 120*a*, 120*b*, . . . , 120*n*. Each one of the receiver arrangements 120*a*, 120*b*, . . . , 120*n* is connectable to a respective antenna element 110*a*, 110*b*, . . . , 110*y*. The antenna elements 110*a*, 110*b*, . . . , 110*y* are preferably operatively connected to the receiver 100 but may, in some embodiments, be comprised in the receiver 100. The antenna elements 110*a*, 110*b*, . . . , 110*y* are preferably arranged spaced apart by at least half a wavelength of a carrier frequency of the wireless transmissions 210*a*, 210*b*, . . . , 210*x*. The antenna elements 110*a*, 110*b*, . . . , 110*y* are configured to provide respective received antenna signals 111*a*, 111*b*, . . . , 111*y* to the receiver arrangements 120*a*, 120*b*, . . . , 120*n*. Assuming all receiver arrangements 120*a*, 120*b*, . . . , 120*n* and all antenna elements 110*a*, 110*b*, . . . , 110*y* are active (which is not necessarily the case), each of the receiver arrangements 120*a*, 120*b*, . . . , 120*n* is provided with one respective received antenna signals 111*a*, 111*b*, . . . , 111*y* from an associated antenna element 110*a*, 110*b*, . . . , 110*y*. The receiver arrangements 120*a*, 120*b*, . . . , 120*n* are configurable to provide phase-shifted antenna signals $120a_1$, $120a_2$, . . . , $120a_x$, . . . , $120n_1$, $120n_2$, . . . , $120n_x$. This will be further explained elsewhere in the present disclosure. The phase-shifted antenna signals $120a_1$, $120a_2$, . . . , $120a_x$, . . . , $120n_1$, $120n_2$, . . . , $120n_x$ are phase-shifted in relation to multiple beam directions $b_a$, $b_b$, . . . , $b_x$, see FIG. 1. In other words, the receiver arrangements 120*a*, 120*b*, . . . , 120*n* process the received antenna signals 111*a*, 111*b*, . . . , 111*y* effectively providing one phase-shifted antenna signals $120a_1$, $120a_2$, . . . , $120a_x$, . . . , $120n_1$, $120n_2$, . . . , $120n_x$ for each beam direction of a wireless transmission 210*a*, 210*b*, . . . , 210*x* for each receiver arrangements 120*a*, 120*b*, . . . , 120*n*.

To exemplify by the wireless system 10 of FIG. 2 comprising two transmitters 200*a*, 200*b* each transmitting one respective wireless transmission 210*a*, 210*b* comprising a respective identical copy of the information stream 201. Both these wireless transmission 210*a*, 210*b* are, in this exemplary embodiment, received by each of the antenna elements 110*a*, 110*b*, . . . , 110*y*. Each of the corresponding received antenna signals 111*a*, 111*b*, . . . , 111*y* (one for each antenna elements 110*a*, 110*b*, . . . , 110*y*) will comprise the received versions of each the wireless transmissions 210*a*, 210*b*. Each of the corresponding received antenna signals 111*a*, 111*b*, . . . , 111*y* is phase-shifted by a respective receiver arrangement 120*a*, 120*b*, . . . , 120*n*. In other words, each received antenna signal 111*a*, 111*b*, . . . , 111*y* is phase shifted according to multiple beam directions $b_a$, $b_b$, . . . , $b_x$ corresponding to a direction of the wireless transmission 210*a*, 210*b*. With two wireless transmissions 210*a*, 210*b* (i.e. two transmitters 200*a*, 200*b*), each receiver arrangement 120*a*, 120*b*, . . . , 120*n* will provide two phase-shifted antenna signals $120a_1$, 120*a*2. In summary, assuming Y antenna elements 110*a*, 110*b*, . . . , 110*y* receive X wireless transmissions 210*a*, 210*b*, . . . , 210*x* and all that of the received antenna signals 111*a*, 111*b*, . . . , 111*y* are phase-shifted by a corresponding receiver arrangement 120*a*, 120*b*, . . . , 120*n*, the receiver 100 will provide a total number N of phase-shifted antenna signals $120a_1$, $120a_2$, . . . , $120a_x$, . . . , $120n_1$, $120n_2$, . . . , $120n_x$ according to $N=Y\cdot X$.

The phase-shifted antenna signals $120a_1$, $120a_2$, . . . , $120a_x$, . . . , $120n_1$, $120n_2$, . . . , $120n_x$ are provided to a first combiner 130 of the receiver 100. The first combiner is configurable to combine the phase-shifted antenna signals $120a_1$, $120a_2$, . . . , $120a_x$, . . . , $120n_1$, $120n_2$, . . . , $120n_x$ providing one or more received beam signals 131*a*, 131*b*, . . . , 131*x*. Preferably, the number of received beam signal 131*a*, 131*b*, . . . , 131*x* corresponds to the number X of wireless transmissions 210*a*, 210*b*, . . . , 210*x* (or number of transmitters 200*a*, 200*b*, . . . , 200*x*). The first combiner 130 is configurable to combine the phase-shifted antenna signals $120a_1$, $120a_2$, . . . , $120a_x$, . . . , $120n_1$, $120n_2$, . . . , $120n_x$ beam direction-wise, i.e. transmitter-wise or wireless transmission-wise. That is to say, the phase-shifted antenna signals $120a_1$, $120a_2$, . . . , $120a_x$, . . . , $120n_1$, $120n_2$, . . . , $120n_x$ corresponding to the a first beam $b_a$ are combined into a first received beam signal 131*a*, the phase-shifted antenna signals $120a_1$, $120a_2$, . . . , $120a_x$, . . . , $120n_1$, $120n_2$, . . . , $120n_x$ corresponding to the a second beam $b_b$ are combined into a second received beam signal 131*b* and so on for all (or at least some) of the phase-shifted antenna signals $120a_1$, $120a_2$, . . . , $120a_x$, . . . , $120n_1$, $120n_2$, . . . , $120n_x$.

With the example of two transmitters 200*a*, 200*b*, each of the receiver arrangements 120*a*, 120*b*, . . . , 120*n* will provide two phase-shifted antenna signals $120a_1$, $120a_2$, one for each transmitter 200*a*, 200*b* (or beam direction $b_a$, $b_b$, or wireless transmission 210*a*, 210*b*). The first combiner 130 will combine the phase-shifted antenna signals $120a_1$, 120*a*2 from each receiver arrangements 120*a*, 120*b*, . . . , 120*n* to provide two received beam signal 131*a*, 131*b*, one for each beam direction $b_a$, $b_b$ (or wireless transmission 210*a*, 210*b*, or transmitter 200*a*, 200*b*). The first combiner 130 may be configured to directly add the phase-shifted antenna signals $120a_1$, $120a_2$, . . . , $120a_x$, . . . , $120n_1$, $120n_2$, . . . , $120n_x$. In some embodiments, the first combiner 130 may be configured to combine the phase-shifted antenna signals $120a_1$, $120a_2$, . . . , $120a_x$, . . . , $120n_1$, $120n_2$, . . . , $120n_x$ by means of a weighted combination e.g. Maximal-ratio combining (MRC), also known as ratio-squared combining, predetection combining.

In order to further exemplify, with two receiver arrangements 120*a*, 120*b* and two transmitters 200*a*, 200*b*, a first phase-shifted antenna signal 120*a*1 for the first transmitter 200*a* from the a first receiver arrangement 120*a* is combined with a first phase-shifted antenna signal 120*b*1 for the first transmitter 200*a* from the second receiver arrangement 120*b* to form a first received beam signal 131*a*. A second phase-shifted antenna signal 120*a*2 for the second transmitter 200*b* from the a first receiver arrangement 120*a* is combined with a second phase-shifted antenna signal 120*b*2 for the second transmitter 200*b* from the second receiver arrangement 120*b* to form a second received beam signal 131*b*. The received beam signals 131*a*, 131*b*, . . . , 131*x* are provided to a second combiner 140 of the receiver 100. The second combiner is configurable to combine the received beam signals 131*a*, 131*b*, . . . , 131*x* thereby providing a combined receive signal 141. The combined receive signal 141 comprises the combined wireless transmissions 210*a*, 210*b*, . . . , 210*x* and consequently, a combined representation of the information stream 201 which will have an increased signal to noise ratio SNR compared to the individual received antenna signals 111*a*, 111*b*, . . . , 111*y*, the individual phase-shifted antenna signals $120a_1$, $120a_2$, . . . , $120a_x$, . . . , $120n_1$, $120n_2$, . . . , $120n_x$ and/or the individual received beam signals 131*a*, 131*b*, . . . , 131*x*. The second combiner 140 may be configured to directly add the received beam signals 131*a*, 131*b*, . . . , 131*x*. Preferably, the second combiner 140 is configured to combine the received beam signals 131*a*, 131*b*, . . . , 131*x* by means of a weighted combination e.g. MRC.

As illustrated in FIG. 4, the first combiner 130 may be configured to determine a phase-shifted antenna signal SNR $bSNRa_1$, $bSNRa_2$, . . . , $bSNRa_x$, . . . , $bSNRn_1$, $bSNRn_2$, . . . , $bSNRn_x$ for one, a plurality of, or each of the phase-shifted antenna signals 120*a*$_1$, 120*a*$_2$, . . . , 120*a*$_x$, . . . , 120*n*$_1$, 120*n*$_2$, . . . , 120*n*$_x$. The phase-shifted antenna signal SNRs $bSNRa_1$, $bSNRa_2$, . . . , $bSNRa_x$, . . . , $bSNRn_1$, $bSNRn_2$, . . . , $bSNRn_x$ is a measure of the signal strength of the associated phase-shifted antenna signal 120*a*$_1$, 120*a*$_2$, . . . , 120*a*$_x$, . . . , 120*n*$_1$, 120*n*$_2$, . . . , 120*n*$_x$ in relation to a noise in a relevant bandwidth. The first combiner 130 may be configured to provide the determined phase-shifted antenna signals SNR $bSNRa_1$, $bSNRa_2$, . . . , $bSNRa_x$, . . . , $bSNRn_1$, $bSNRn_2$, . . . , $bSNRn_x$ to other parts of the receiver and/or to external arrangements such as a transmitter, a memory, a controller etc. The first combiner 130 may, in some embodiments, be configured to determine and/or provide an indication, e.g. a metric indicating or referencing a range of an absolute value of the phase-shifted antenna signal SNRs $bSNRa_1$, $bSNRa_2$, . . . , $bSNRa_x$, . . . , $bSNRn_1$, $bSNRn_2$, . . . , $bSNRn_x$. However, it should be noted that the phase-shifted antenna signals 120*a*$_1$, 120*a*$_2$, . . . , 120*a*$_x$, . . . , 120*n*$_1$, 120*n*$_2$, . . . , 120*n*$_x$ may in some scenarios be too weak to accurately determine the phase-shifted antenna signal SNRs $bSNRa_1$, $bSNRa_2$, . . . , $bSNRa_x$, . . . , $bSNRn_1$, $bSNRn_2$, . . . , $bSNRn_x$.

As further illustrated in FIG. 4, the second combiner 140 may be configured to determine a transmitter SNR, tSNRa, tSNRb, . . . , tSNRx for one, a plurality of, or each of the received beam signals 131*a*, 131*b*, . . . , 131*x*. The transmitter SNR, tSNRa, tSNRb, . . . , tSNRx is a measure of the signal strength of the associated received beam signals 131*a*, 131*b*, . . . , 131*x* in relation to a noise in a relevant bandwidth. The second combiner 140 may be configured to provide the determined transmitter SNRs, tSNRa, tSNRb, . . . , tSNRx to other parts of the receiver and/or to external arrangements such as a transmitter, a memory, a controller etc. The second combiner 140 may, in some embodiments, be configured to determine and/or provide an indication, e.g. a metric indicating or referencing a range of an absolute value of the transmitter SNRs, tSNRa, tSNRb, . . . , tSNRx.

In some embodiments, the transmitter SNR, tSNRa, tSNRb, . . . , tSNRx is communicated back to the wireless system 10 in general, and the system controller 15 in particular. In these embodiments, the system controller may compare the transmitter SNR, tSNRa, tSNRb, . . . , tSNRx to a transmitter SNR threshold. If the transmitter SNR, tSNRa, tSNRb, . . . , tSNRx is below the transmitter SNR threshold, the transmitter 200*a*, 200*b*, . . . , 200*x* associated with the transmitter SNR, tSNRa, tSNRb, . . . , tSNRx being below the transmitter SNR threshold may be configured to stop transmitting to the receiver 100. In other words, responsive to the transmitter SNR tSNRa, tSNRb, . . . , tSNRx being below a transmitter SNR threshold, the system controller 15 may configure the transmitter 200*a*, 200*b*, . . . , 200*x* associated with the transmitter SNR tSNRa, tSNRb, . . . , tSNRx being below a transmitter SNR threshold to stop transmitting the wireless transmission 210*a*, 210*b*, . . . , 210*x* comprising a respective identical copy of an information stream 201 to the apparatus 400 comprising the receiver 100.

The second combiner 140 may, additionally or alternatively, comprise a receive signal SNR device 149 (see FIG. 8) configured to determine a receive signal SNR rSNR for the combined receive signal 141. The receive signal SNR rSNR is a measure of the signal strength of the combined receive signal 141 in relation to a noise in a relevant bandwidth. The second combiner 140 may be configured to provide the determined receive signal SNR rSNR to other parts of the receiver and/or to external arrangements such as a transmitter, a memory, a controller etc. The second combiner 140 may, in some embodiments, be configured to determine and/or provide an indication, e.g. a metric indicating or referencing a range of an absolute value of the receive signal SNR rSNR.

Figure 5:
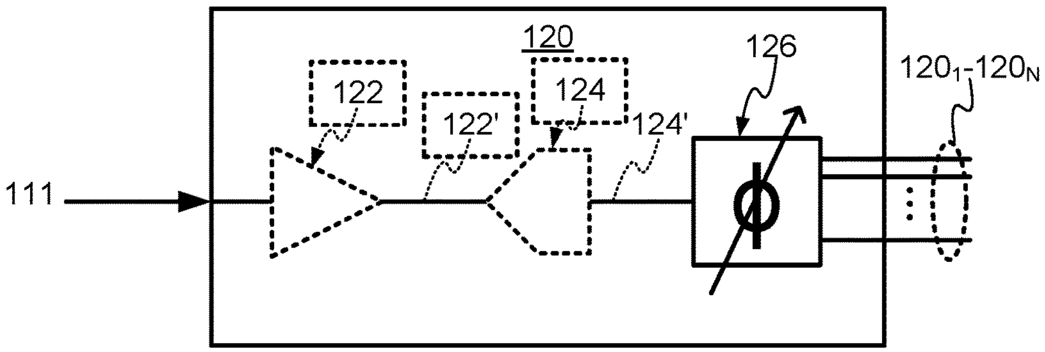
FIG. 5 is a block diagram of a receiver arrangement according to some embodiments of the present disclosure.

With reference to FIG. 5, one embodiments of a receiver arrangement 120 will be described. The receiver arrangement 120 of FIG. 5 may form part of, or be comprised in, e.g. any receiver 100, apparatus 400 of the present disclosure and the receiver 100 of FIG. 4 may comprise a plurality of this receiver arrangement 120. The receiver arrangement 120 is configured to receive one received antenna signal 111 and provide a plurality of phase-shifted antenna signals 120*a*$_1$, 120*a*$_2$, . . . , 120*a*$_x$, . . . , 120*n*$_1$, 120*n*$_2$, . . . , 120*n*$_x$ according to the present disclosure. To this end, the receiver arrangement 120 preferably comprises a phase-shift arrangement 126 (beamform arrangement). The phase-shift arrangement is configurable to phase-shift the received antenna signal 111 in relation to the beam directions $b_a$, $b_b$, . . . , $b_x$. This provides the phase-shifted antenna signals 120*a*$_1$, 120*a*$_2$, . . . , 120*a*$_x$, . . . , 120*n*$_1$, 120*n*$_2$, . . . , 120*n*$_x$ for the one, a plurality of, or each of the multiple transmitters 200*a*, 200*b*, . . . , 200*x*. The phase-shift arrangement may comprise a plurality of phase rotators, one for each beam direction $b_a$, $b_b$, . . . , $b_x$, configured to rotate the phase of the received antenna signal 111.

In some embodiments, the receiver arrangement 120 may comprise a low noise amplifier 122 configured to amplify the received antenna signal 111 and provide an amplified received antenna signal as an LNA output 122'. In order to limit a noise factor NF of the receiver arrangement 120, the LNA 122 is preferably arranged as close as possible to the antenna element 110.

In some embodiments, the receiver arrangement 120 may comprise an analog to digital converter (ADC) 124 configurable to convert the received antenna signal 111 into a corresponding digital representation of the received antenna signals 111 as an ADC output 124'. This is beneficial as scaling, configuration and filtering is preferably performed in the digital domain due to e.g. cost reasons. The ADC 124 is preferably arranged upstream of the phase-shift arrangement 126, i.e. between the phase-shift arrangement 126 and the associated antenna element 110, or between the phase-shift arrangement 126 and the LNA 122 (if present). In some embodiments, the receiver arrangement 120 may comprise one or more down-converter mixers configured to down-convert the received antenna signal 111 providing a down-converted received antenna signal 111 having a lower carrier frequency than the received antenna signal 111. In some embodiments, the receiver arrangement 120 further comprises one or more anti-alias filters configured to attenuate aliasing frequencies in the received antenna signal 111. Any downconverter mixers and/or anti-alias filters comprised in the receiver arrangement 120 are preferably arranged between the ADC 124 and the LNA 122 (if present). In the digital domain, the phase-shifting may be performed by a two-dimensional rotation in the IQ-plane of the received antenna signals 111. As mentioned previously, each beam direction $b_a$, $b_b$, . . . , $b_x$ correspond to one rotation (or phase-shift) of each received antenna signal 111.

Figure 6:
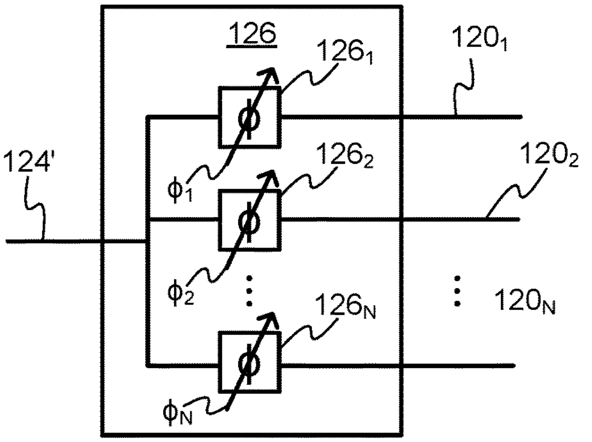
FIG. 6 is a block diagram of a phase-shift arrangement according to some embodiments of the present disclosure.

With reference to FIG. 6, one embodiment of a phase-shift arrangement 126 will be explained. Assuming that the receiver arrangement 120 comprises an ADC 124, the ADC output 124' is provided to the phase-shift arrangement 126. The ADC output 124' is divided, e.g. copied as this is the digital domain, and provided to as input to one or more phase-shift elements $\mathbf{126}_1$, $\mathbf{126}_2$, . . . , $\mathbf{126}_N$ of the phase-shift arrangement 126. The phase-shift arrangement 126 of FIG. 6 is illustrated as comprising a plurality of phase-shift elements $\mathbf{126}_1$, $\mathbf{126}_2$, . . . , $\mathbf{126}_N$, preferably at least as many as the number of beam directions $b_a$, $b_b$, . . . , $b_x$. In such embodiments, the phase-shift elements $\mathbf{126}_1$, $\mathbf{126}_2$, . . . , $\mathbf{126}_N$ preferably operate in parallel such that the phase-shifted antenna signals $\mathbf{120}_1$, $\mathbf{120}_2$, . . . , $\mathbf{120}_N$ are provided in parallel from a respective phase-shift element $\mathbf{126}_1$, $\mathbf{126}_2$, . . . , $\mathbf{126}_N$. In some embodiments, the number of phase-shift elements $\mathbf{126}_1$, $\mathbf{126}_2$, . . . , $\mathbf{126}_N$ is fewer than the number of beam directions $b_a$, $b_b$, . . . , $b_x$ and the phase-shift elements $\mathbf{126}_1$, $\mathbf{126}_2$, . . . , $\mathbf{126}_N$ will work in series and the ADC output 124' (or received antenna signal 111, or ADC output 124') will be buffered before provided to the phase-shift elements $\mathbf{126}_1$, $\mathbf{126}_2$, . . . , $\mathbf{126}_N$. If nothing else is specified, the number of phase-shift elements $\mathbf{126}_1$, $\mathbf{126}_2$, . . . , $\mathbf{126}_N$ of the phase-shift arrangement 126 is equal to or greater than the number of beam directions $b_a$, $b_b$, . . . , $b_x$ (i.e. the number of transmitters 200*a*, 200*b*, . . . , 200*x*, the number of wireless transmissions 210*a*, 210*b*, . . . , 210*x*). Each of the phase-shift elements $\mathbf{126}_1$, $\mathbf{126}_2$, . . . , $\mathbf{126}_N$ is configured to phase-shift the ADC output 124' by a predetermined or configurable phase shift $\phi_1$, $\phi_2$, . . . , $\phi_N$. In some embodiments, each predetermined or configurable phase shift $\phi_1$, $\phi_2$, . . . , ON may be different for each phase-shift elements $\mathbf{126}_1$, $\mathbf{126}_2$, . . . , $\mathbf{126}_N$. In some embodiments, one or more of the predetermined or configurable phase shifts $\phi_1$, $\phi_2$, . . . , $\phi_N$ may be equal some phase-shift elements $\mathbf{126}_1$, $\mathbf{126}_2$, . . . , $\mathbf{126}_N$.

It should be mentioned that, as the antenna elements 110*a*, 110*b*, . . . , 110*y* are preferably arranged spaced apart by at least half a wavelength of the carrier frequency of the wireless transmissions 210*a*, 210*b*, . . . , 210*x*. As a consequence, each antenna elements 110*a*, 110*b*, . . . , 110*y* is likely to receive the wireless transmissions 210*a*, 210*b*, . . . , 210*x* with different phases. Consequently, it is preferred to allow the phase shift $\phi_1$, $\phi_2$, . . . , $\phi_N$ of the phase-shift elements $\mathbf{126}_1$, $\mathbf{126}_2$, . . . , $\mathbf{126}_N$ to differ between phase-shift arrangement 126 of different receiver arrangements 120*a*, 120*b*, . . . , 120*n*.

In order to determine the phase shifts $\phi_1$, $\phi_2$, . . . , ØN of the phase-shift elements $\mathbf{126}_1$, $\mathbf{126}_2$, . . . , $\mathbf{126}_N$, beam scanning may be employed. This may be performed by identifying the beam direction $b_a$, $b_b$, . . . , $b_x$, i.e. the phase shifts $\phi_1$, $\phi_2$, . . . , ØN, for each phase shift arrangement 126, providing the phase-shifted antenna signals $\mathbf{120}_1$, $\mathbf{120}_2$, . . . , $\mathbf{120}_N$. In some embodiments, a continuous beam scanning may be employed during operation. The phase-shift arrangement 126 therefore forms additional beams, scanning beams, where additional correlators are used to find the timing and strength of alternative beams. The result of these additional beams may be reported back to the wireless system 10 to e.g. a transmitter 200*a*, 200*b*, . . . , 200*x* and/or the system controller 15. In some embodiments, a decision to change transmitter 200*a*, 200*b*, . . . , 200*x* to communicate with the apparatus 400 may be taken by the system controller 15. A decision to update the phase shifts $\phi_1$, $\phi_2$, . . . , $\phi_N$ used by the phase-shift elements $\mathbf{126}_1$, $\mathbf{126}_2$, . . . , $\mathbf{126}_N$ is preferably taken at the apparatus 400 comprising the phase-shift elements $\mathbf{126}_1$, $\mathbf{126}_2$, . . . , $\mathbf{126}_N$. However, in some embodiments, the decision to update the phase shifts $\phi_1$, $\phi_2$, . . . , $\phi_N$ used by the phase-shift elements $\mathbf{126}_1$, $\mathbf{126}_2$, . . . , $\mathbf{126}_N$ may be taken by the system controller 15.

As previously indicated, the transmitter SNRs, tSNRa, tSNRb, . . . , tSNRx and strength of existing received beam signals 131*a*, 131*b*, . . . , 131*x* may be reported to the wireless system 10 to e.g. a transmitter 200*a*, 200*b*, . . . , 200*x* and/or the system controller 15, such that a decision may be made by e.g. the system controller 15 to increase or reduce the resources used, e.g. number of transmitters 200*a*, 200*b*, . . . , 200*x*, transmit power of each wireless transmission 210*a*, 210*b*, . . . , 210*x* etc.

To obtain the wireless transmission 210*a*, 210*b*, . . . , 210*x* (signals) coming from different directions, a very versatile approach is to use digital beamforming. Then multiple beams may be formed in the digital domain. Preferably, each beam is as sharp as possible, i.e. narrow or exact in its beam direction $b_a$, $b_b$, . . . , $b_x$, to select the signal of interest with minimum of noise and interference. To limit the hardware the maximum number of signals to receive is preferably determined beforehand. In one embodiment, the receiver 100 is configured to receive a maximum of eight beams, i.e. transmissions from eight transmitter 200*a*, 200*b*, . . . , 200*h*. This means that the phase-shift arrangement 126 of each receiver arrangement 120*a*, 120*b*, . . . , 120*n* comprises eight phase-shift elements $\mathbf{126}_1$, $\mathbf{126}_2$, . . . , $\mathbf{126}_N$.

In some embodiments, two or more phase-shift arrangement 126 comprise further phase-shift elements configured to provide tracking beams operable to scan for strong signals. Preferably, the receiver arrangements 120*a*, 120*b*, . . . , 120*n* of these embodiments further comprise, or are operatively connected to, correlators configured to the synchronization signals of each tracked beam (wireless transmissions 210*a*, 210*b*, . . . , 210*x*). Preferably, one correlator is provided for each tracked beam.

In order to effectively enable synchronization and beam tracking, the wireless transmissions 210*a*, 210*b*, . . . , 210*x* may be designed in different ways. One exemplary embodiment comprises having a common part in each wireless transmission 210*a*, 210*b*, . . . , 210*x* which the correlators may identify. The common part may be a predetermined common part known to the receiver 100 provided to simplify correlation at the receiver 100. In some embodiments, the common part is a common data part that may or may not be known by receiver 100 beforehand. This common part may be followed by e.g. coded information about origin of the wireless transmission 210*a*, 210*b*, . . . , 210*x* (e.g. the transmitter 200*a*, 200*b*, . . . , 200*x*), coded information about the information stream 201 etc. It should be mentioned that not all wireless transmissions 210*a*, 210*b*, . . . , 210*x* are required to comprise the latter information, in some embodiments the wireless transmissions 210*a*, 210*b*, . . . , 210*x* may comprise a sequence of reduced length used specifically for phase tracking. The phase relative to the local oscillator may be detected as the phase of the correlator output peak in the I, Q plane.

Figure 7:
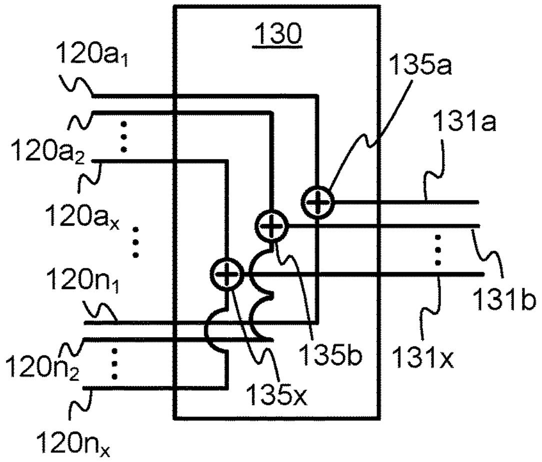
FIG. 7 is a block diagram of a first combiner according to some embodiments of the present disclosure.

The first combiner 130 will be further explained with reference to FIG. 7. The first combiner 130 is provided with the phase-shifted antenna signals $\mathbf{120}a_1$, $\mathbf{120}a_2$, . . . , $\mathbf{120}a_x$, . . . , $\mathbf{120}n_1$, $\mathbf{120}n_2$, . . . , $\mathbf{120}n_x$. As previously mentioned, the first combiner 130 is configurable to combine the phase-shifted antenna signals $\mathbf{120}a_1$, $\mathbf{120}a_2$, . . . , $\mathbf{120}a_x$, . . . , $\mathbf{120}n_1$, $\mathbf{120}n_2$, . . . , $\mathbf{120}n_x$ providing one or more received beam signals 131*a*, 131*b*, . . . , 131*x*. The first combiner 130 of FIG. 7 is configured to combine the phase-shifted antenna signals $\mathbf{120}a_1$, $\mathbf{120}a_2$, . . . , $\mathbf{120}a_x$, . . . , $\mathbf{120}a_1$, $\mathbf{120}n_2$, . . . , $\mathbf{120}n_x$ beam direction-wise, i.e. transmitter-wise or wireless transmission-wise. That is to say, the phase-shifter antenna signals 120$a_1$, 120$b_1$, . . . , 120$n_1$ being received from a first transmitter 210$a$ are combined by a first combining element 135$a$ to form a first received beam signals 131$a$. This is repeated for each of the signals received from the transmitters 200$a$, 200$b$, . . . , 200$x$ up until the phase-shifter antenna signals 120$a_x$, 120$b_x$, . . . , 120$n_x$ being received from a last transmitter 210$x$ are combined by a last first combining element 135$x$ to form a last received beam signals 131$x$.

The first combiner 130 may, as mentioned, be configured to determine the phase-shifted antenna signal SNR bSNRa$_1$, bSNRa$_2$, . . . , bSNRa$_x$, . . . , bSNRn$_1$, bSNRn$_2$, . . . , bSNRn$_x$ for one or more or each of the phase-shifted antenna signals 120$a_1$, 120$a_2$, . . . , 120$a_x$, . . . , 120$n_1$, 120$n_2$, . . . , 120$n_x$. The determined phase-shifted antenna signal SNR bSNRa$_1$, bSNRa$_2$, . . . , bSNRa$_x$, . . . , bSNRn$_1$, bSNRn$_2$ may be compared to a phase-shifted antenna signal SNR threshold, and if the determined phase-shifted antenna signal SNR bSNRa$_1$, bSNRa$_2$, . . . , bSNRa$_x$, . . . , bSNRn$_1$, bSNRn$_2$ is below the phase-shifted antenna signal SNR threshold, combining the phase-shifted antenna signals 120$a_1$, 120$a_2$, . . . , 120$a_x$, . . . , 120$n_1$, 120$n_2$, . . . , 120$n_x$ associated with that phase-shifted antenna signal SNR bSNRa$_1$, bSNRa$_2$, . . . , bSNRa$_x$, . . . , bSNRn$_1$, bSNRn$_2$ may decrease the SNR of the resulting received beam signal 131$a$, 131$b$, . . . , 131$x$. Therefore, in some embodiments, the first combiner 130 may be configured not to include received beam signals 131$a$, 131$b$, . . . , 131$x$ phase-shifted antenna signals 120$a_1$, 120$a_2$, . . . , 120$a_x$, . . . , 120$n_1$, 120$n_2$, . . . , 120$n_x$ having a phase-shifted antenna signal SNR bSNRa$_1$, bSNRa$_2$, . . . , bSNRa$_x$, . . . , bSNRn$_1$, bSNRn$_2$ below the phase-shifted antenna signal SNR threshold in the corresponding received beam signal 131$a$, 131$b$, . . . , 131$x$. In some embodiments, wherein the first combiner 130 is configured to combine the phase-shifted antenna signals 120$a_1$, 120$a_2$, . . . , 120$a_x$, . . . , 120$n_1$, 120$n_2$, . . . , 120$n_x$ e.g. using MRC or any other weighted combining method, a weight associated with each phase-shifted antenna signal 120$a_1$, 120$a_2$, . . . , 120$a_x$, . . . , 120$n_1$, 120$n_2$, . . . , 120$n_x$ may be configured based on the phase-shifted antenna signal SNR bSNRa$_1$, bSNRa$_2$, . . . , bSNRa$_x$, . . . , bSNRn$_1$, bSNRn$_2$. Responsive to the phase-shifted antenna signal SNR bSNRa$_1$, bSNRa$_2$, . . . , bSNRa$_x$, . . . , bSNRn$_1$, bSNRn$_2$ being below the phase-shifted antenna signal SNR threshold, the weight of the phase-shifted antenna signals 120$a_1$, 120$a_2$, . . . , 120$a_x$, . . . , 120$n_1$, 120$n_2$, . . . , 120$n_x$ associated with the phase-shifted antenna signal SNR bSNRa$_1$, bSNRa$_2$, . . . , bSNRa$_x$, . . . , bSNRn$_1$, bSNRn$_2$ being below the phase-shifted antenna signal SNR threshold may be decreased (reduced). In such embodiments, a phase-shifted antenna signals 120$a_1$, 120$a_2$, . . . , 120$a_x$, . . . , 120$n_1$, 120$n_2$, . . . , 120$n_x$ being associated with a phase-shifted antenna signal SNR bSNRa$_1$, bSNRa$_2$, . . . , bSNRa$_x$, . . . , bSNRn$_1$, bSNRn$_2$ below the phase-shifted antenna signal SNR threshold may still be comprised in the received beam signal 131$a$, 131$b$, . . . , 131$x$ but will be given a reduced weight (gain, multiplier etc.) when combined with the other phase-shifted antenna signals 120$a_1$, 120$a_2$, . . . , 120$a_x$, . . . , 120$n_1$, 120$n_2$, . . . , 120$n_x$. Accordingly, the weight of a phase-shifted antenna signals 120$a_1$, 120$a_2$, . . . , 120$a_x$, . . . , 120$n_1$, 120$n_2$, . . . , 120$n_x$ may be increased responsive to the phase-shifted antenna signal SNR bSNRa$_1$, bSNRa$_2$, . . . , bSNRa$_x$, . . . , bSNRn$_1$, bSNRn$_2$ being above the phase-shifted antenna signal SNR threshold. It should be mentioned that the weight may, in some embodiments, be set to zero effectively omitting the associated phase-shifted antenna signals 120$a_1$, 120$a_2$, . . . , 120$a_x$, . . . , 120$n_1$, 120$n_2$, . . . , 120$n_x$ from the received beam signal 131$a$, 131$b$, . . . , 131$x$.

As previously mentioned the phase-shifted antenna signals 120$a_1$, 120$a_2$, . . . , 120$a_x$, . . . , 120$n_1$, 120$n_2$, . . . , 120$n_x$ may, in some scenarios, be too weak to accurately determine the phase-shifted antenna signal SNRs bSNRa$_1$, bSNRa$_2$, . . . , bSNRa$_x$, . . . , bSNRn$_1$, bSNRn$_2$, . . . , bSNRn$_x$. In such scenarios, it may be preferable to combine the the phase-shifted antenna signals 120$a_1$, 120$a_2$, . . . , 120$a_x$, . . . , 120$n_1$, 120$n_2$, . . . , 120$n_x$ directly, without weights. In some embodiments, the first combiner 130 is configurable to use weighted combining or direct combining depending on an ability to determine the phase-shifted antenna signal SNRs bSNRa$_1$, bSNRa$_2$, . . . , bSNRa$_x$, . . . , bSNRn$_1$, bSNRn$_2$, . . . , bSNRn$_x$.

Figure 8:
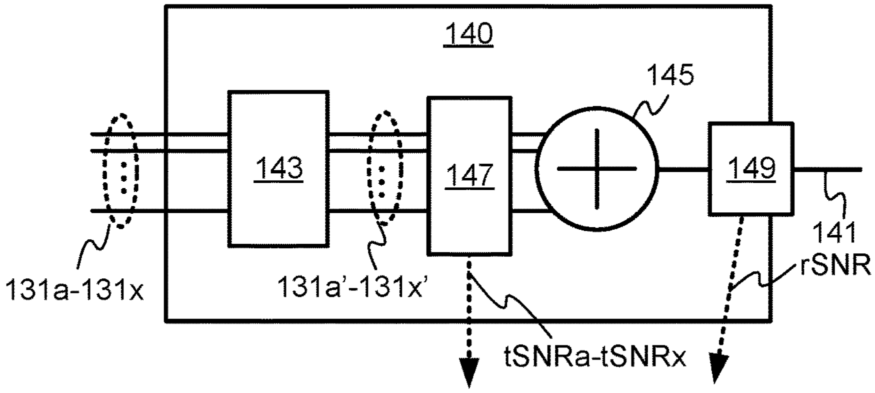
FIG. 8 is a block diagram of a second combiner according to some embodiments of the present disclosure.

With reference to FIG. 8, some additional detail relating to the second combiner 140 will be presented. The second combiner 140 preferably comprises a synchronizer 143. The synchronizer 143 is configurable to synchronize the received beam signals 131$a$, 131$b$, . . . , 131$x$ and thereby providing synchronized beam signals 131$a'$, 131$b'$, . . . , 131$x'$. The synchronization is performed with regards to at least one of a time and/or a phase difference between the received beam signals 131$a$, 131$b$, . . . , 131$x$. The second combiner 140 may further comprise a combining element 145 configured to receive the synchronized beam signals 131$a'$, 131$b'$, . . . , 131$x'$ and combine them into one combined receive signal 141.

The second combiner 140 may further comprise a transmitter SNR device 147 configured to determine the transmitter SNR tSNRa, tSNRb, . . . , tSNRx for one or more of, a plurality of, or of each of the received beam signals 131$a$, 131$b$, . . . , 131$x$. The determined transmitter SNR tSNRa, tSNRb, . . . , tSNRx may be compared to a transmitter SNR threshold. If the transmitter SNR tSNRa, tSNRb, . . . , tSNRx is below the transmitter SNR threshold, there is a risk that the received beam signal 131$a$, 131$b$, . . . , 131$x$ associated with the transmitter SNR tSNRa, tSNRb, . . . , tSNRx being below the transmitter SNR threshold will decrease the SNR of the combined receive signal 141 rather than increase it. Therefore, the second combiner 140 may be configured not to include received beam signal 131$a$, 131$b$, . . . , 131$x$ having a transmitter SNR tSNRa, tSNRb, . . . , tSNRx below the transmitter SNR threshold in the combined receive signal 141. In some embodiments, wherein the second combiner 140 is configured to combine the received beam signals 131$a$, 131$b$, . . . , 131$x$ using MRC, a weight associated with each received beam signal 131$a$, 131$b$, . . . , 131$x$ may be configured based on the transmitter SNR tSNRa, tSNRb, . . . , tSNRx. Responsive to the transmitter SNR tSNRa, tSNRb, . . . , tSNRx being below the transmitter SNR threshold, the wight of the received beam signal 131$a$, 131$b$, . . . , 131$x$ associated with the transmitter SNR tSNRa, tSNRb, . . . , tSNRx being below the transmitter SNR threshold may be decreased (reduced). In such embodiments, a received beam signal 131$a$, 131$b$, . . . , 131$x$ being associated with a transmitter SNR tSNRa, tSNRb, . . . , tSNRx below the transmitter SNR threshold may still be comprised in the combined receive signal 141 but will be given a reduced weight (gain, multiplier etc.) when combined with the other received beam signal 131$a$, 131$b$, . . . , 131$x$. Accordingly, the weight of a received beam signal 131$a$, 131$b$, . . . , 131$x$ may be increased responsive to the transmitter SNR tSNRa, tSNRb, . . . , tSNRx being above the transmitter SNR threshold. It should be mentioned that the weight may, in some embodiments, be set to zero effectively omitting the associated received beam signals 131$a$, 131$b$, . . . , 131$x$ from the combined receive signal 141.

Additionally, or alternatively, as previously mentioned, the second combiner 140 may comprise the receive signal SNR device 149 configured to determine the receive signal SNR rSNR of the combined receive signal 141. The determined receive signal SNR rSNR may be compared to a receive signal SNR threshold. If the receive signal SNR is above the receive signal SNR threshold, one or more of the preceding arrangements in the receiver chain may be turned off in order to save power. Additionally, or alternatively, one or more to of the received beam signal 131$a$, 131$b$, . . . , 131$x$ (i.e. wireless transmissions 210$a$, 210$b$, . . . , 210$x$) may be excluded from the combined receive signal 141 meaning that beamforming etc. associated with that wireless transmission 210$a$, 210$b$, . . . , 210$x$ may be turned off. Further to this, if the determined receive signal SNR rSNR is below the receive signal SNR threshold (which may be configurable or having a lower value and an upper value), more receiver arrangements 120$a$, 120$b$, . . . , 120$n$ may be activated in order combine further phase-shifted antenna signals 120$a_1$, 120$a_2$, . . . , 120$a_x$, . . . , 120$n_1$, 120$n_2$, . . . , 120$n_x$.

Correspondingly to the phase-shifted antenna signals 120$a_1$, 120$a_2$, . . . , 120$a_x$, . . . , 120$n_1$, 120$n_2$, . . . , 120$n_x$ at the first combiner 130, the received beam signal 131$a$, 131$b$, . . . , 131$x$ may, in some scenarios, be too weak to accurately determine the transmitter SNR tSNRa, tSNRb, . . . , tSNRx. In such scenarios, it may be preferable to combine the received beam signal 131$a$, 131$b$, . . . , 131$x$ directly, without weights. In some embodiments, the second combiner 140 is configurable to use weighted combining or direct combining depending on an ability to determine the transmitter SNR tSNRa, tSNRb, . . . , tSNRx.

It should be noted that, although the receive signal SNR device 149 is described as comprised in the second combiner 140, the receive signal SNR device 149 may very well be comprised in the receiver 100 and not in the second combiner 140.

Figure 9:
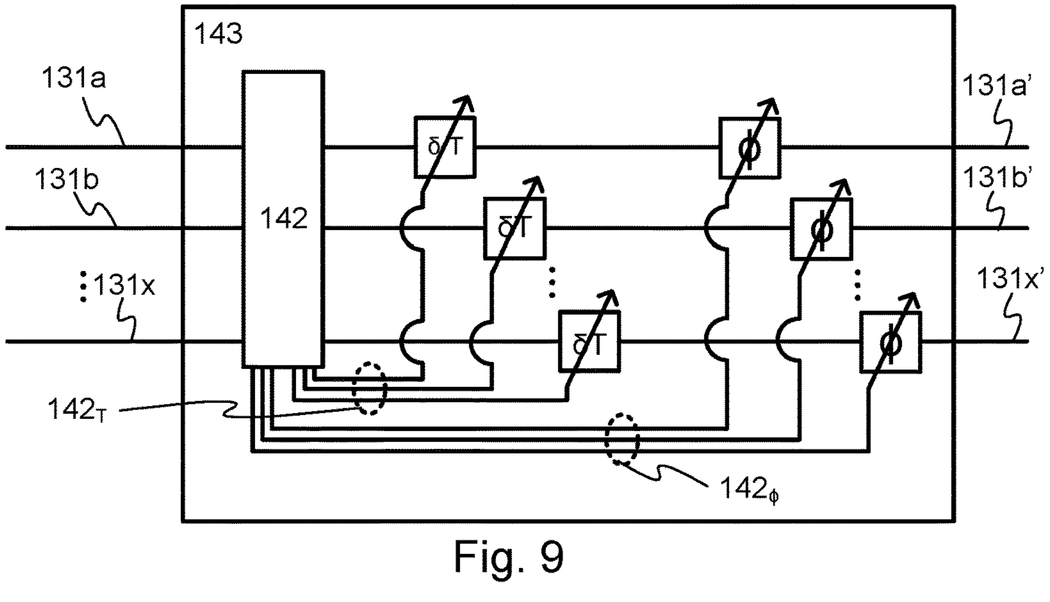
FIG. 9 is a block diagram of a synchronizer according to some embodiments of the present disclosure.

One exemplary embodiment of the synchronizer 143 (correlator) is illustrated in FIG. 9. The received beam signals 131$a$, 131$b$, . . . , 131$x$ are provided to a phase/time detector 142 of the synchronizer 143 which determines a time compensation 142$_T$ and a phase compensation 142¢ for, preferably all, but for at least one of the received beam signals 131$a$, 131$b$, . . . , 131$x$. The determined time compensations 142$_T$ and a phase compensations 142$_\Phi$ are applied to the associated received beam signals 131$a$, 131$b$, . . . , 131$x$ thereby providing the synchronized beam signals 131$a'$, 131$b'$, . . . , 131$x'$.

In order for the synchronizer to accurately determine the time compensations 142$_T$ and a phase compensations 142$_\Phi$ it may utilize correlation between the received beam signals 131$a$, 131$b$, . . . , 131$x$. All received beam signals 131$a$, 131$b$, . . . , 131$x$ comprise the same common information stream 201 and in some embodiments the synchronizer determines the time and/or phase difference between the received beam signals 131$a$, 131$b$, . . . , 131$x$ based on the information stream 201. This may be performed using e.g. autocorrelation, cross correlation etc.

In some embodiments, the wireless transmissions 210$a$, 210$b$, . . . , 210$x$ comprise synchronization information such as the synchronization signal 203. As mentioned, the synchronization signal 203 is typically transmitted before the data, so that proper delays, i.e. time compensations 142$_T$ and phase rotation, i.e. phase compensations 142$_\Phi$ may be set up before the data arrives.

In the first exemplary embodiment, all synchronization signals 203 have a common sequence that the synchronizer 143 will look for, followed by a sequence for the identity of the information stream 201 that this wireless transmission 210$a$, 210$b$, . . . , 210 belongs to, and finally a sequence identifying which transmitter 200$a$, 200$b$, . . . , 200$x$ transmitted it. Furthermore, not all synchronization signals 203 have to be the same, this means that some may be transmitted with just the common sequence to maintain synchronization, thereby saving resources.

In a second exemplary embodiment, each wireless transmission 210$a$, 210$b$, . . . , 210 has a specific sequence, so the correlator will not find other streams than targeted, followed by the AP identification. Also in this exemplary embodiment, the identifier 205 associated with the transmitter 200$a$, 200$b$, . . . , 200$x$ may be omitted in some wireless transmission 210$a$, 210$b$, . . . , 210.

Finding the correlation peak for a long and wideband sequence with low auto correlation will result in an accurate timing. The phase of the correlator peak output in the I, Q plane will also show the phase relation of the incoming wireless transmission 210$a$, 210$b$, . . . , 210 with respect to the local oscillator. With this information, the received beam signals 131$a$, 131$b$, 131$x$ may be properly delayed and phase rotated, so that all received beam signals 131$a$, . . . 131$b$, . . . , 131$x$ may be combined coherently. However, the phase relations may change over time. With devices and objects in the environment moving, the phase differences of the received beam signals 131$a$, 131$b$, . . . , 131$x$ from different paths will drift over time and thereby require changes to the phase compensations 142$_\Phi$. It is therefore beneficial to perform phase measurements regularly (i.e. estimate the phase differences of the received beam signals 131$a$, 131$b$, . . . , 131$x$) in order to ensure that the phase compensations 142$_\Phi$ remains valid.

To exemplify, assume operation at 30 GHz and devices moving by up to 10 m/s. The wavelength at 30 GHz is equal to 10 mm. It will then take 1 ms to move one full wavelength. If the phase is synchronized every 50 us, the phase of one path will not change by more than 18° between synchronization events, which only cause a very limited loss when adding the vectors together. Assume that 1 us is spent on synchronization every 50 us, this will result in a loss due to synchronization signal overhead of only 2%. In other words, only 2% of the time is spent not transmitting the data signal, i.e. the information stream 201. Assume further that a 400 MHz bandwidth signal is provided, this allows the transmission of 400 symbols in 1 μs, which will result in a processing gain of 26 dB. Even if half of a transmission time is spent overhead data such as stream id and identifier 205, the resulting processing would still be at 23 dB. Assuming that ten wireless transmissions 210$a$, 210$b$, . . . , 210$x$ are combined, gaining 10 dB SNR compared to a single wireless transmission 210$a$, 210$b$, . . . , 210$x$ (assuming them to have equal SNR). This example shows that, even in a case with ten combined wireless transmissions, the synchronization signal will still have an SNR 13 dB above the combined receive signal 141, at an overhead of just 2%, indicating the potential for achieving well synchronized signals with limited overhead.

In order to reduce a risk of timing errors, and to reduce a power consumption in the synchronizer 143, it is advantageous to reduce the time difference between wireless transmissions 210$a$, 210$b$, . . . , 210$x$ arriving at the antenna elements 110$a$, 110$b$, . . . , 110$y$. This is, in some embodiments, mitigated by facilitated by the apparatus 400 comprising the receiver 100 informing the wireless system 10 of its position, e.g. by providing location data from a GNSS system like GPS or Galileo.

Additionally, or alternatively, in some embodiments, in order to reduce a risk of timing errors the wireless system 10 may intermittently transmit a comparably long synchronization signal 203, e.g. 10 us or more. A long synchronization signal 203 will provide increased confidence and accuracy in the synchronization and thereby the time compensations 142$_T$ and phase compensations 1420.

This may be combined with the wireless system 10 transmitting intermediate comparably short synchronization signals 203 between the comparably long synchronization signal 203. Generally, it is preferred to keep the synchronization sequence long enough to reliably find it. A signal from a single transmitter 200*a*, 200*b*, . . . , 200*x* may be weak, implying that sufficient processing gain has to be applied by the receiver 100 when correlating for the synchronization signals 203. To exemplify, a synchronization signals 203 of length 100 bits would give a processing gain of 20 dB. As previously mentioned, the synchronization signals 203 may be configured to also carry some data, each bit is preferably subjected to some processing gain, but when the message has been found using the sequence, less processing gain may be applied for the data portion. The comparably short synchronization signals 203 are correlated more frequently than a longer synchronization signal, thereby tracking the time and phase drift in small steps and further reducing the risk for mistakes in phase and time detection. It should be mentioned that, to save power, a fixed single correlation time instance may be employed for the shorter correlations. As the bandwidth is about 100 times lower than the carrier frequency, the timing drift is small when compared to phase drift. Consequently, in some embodiments, only the phase drift is tracked in the intermediate correlations of the comparably short synchronization signals 203 preformed between correlations of the comparably long synchronization signals 203.

Figure 10:
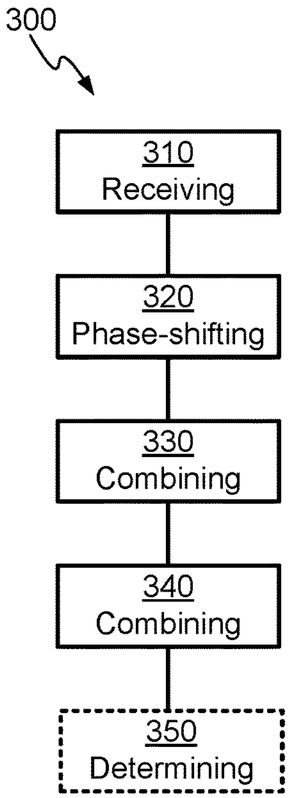
FIG. 10 is a flowchart of a method for receiver beamforming according to some embodiments of the present disclosure.

With reference to FIG. 10, a method 300 for receiver beamforming according to the teachings of the present disclosure will be detailed. Either one of, or a combination of, a system controller 15 as presented herein, a wireless transmitter 200*a*, 200*b*, . . . , 200*x* as presented herein, a receiver 100 as presented herein, an apparatus 400 as presented herein, an integrated circuit 500 (see FIG. 16) as presented herein and/or a data processing unit 800 (see FIG. 18*c*) as presented herein may be configured to wholly, or in part, execute the full, or part of, the method 300. Further to this, either one, or a combination of, a system controller 15 as presented herein, a wireless transmitter 200*a*, 200*b*, . . . , 200*x* as presented herein, a receiver 100 as presented herein, an apparatus 400 as presented herein, an integrated circuit 500 (see FIG. 16) as presented herein and/or a data processing unit 800 (see FIG. 18*c*) as presented herein may be configured to cause execution of the full, or part of, the method 300.

The method is suitable for execution by a receiving entity during operation in the long range made M3 as described with reference to FIG. 3. That is to say, the third apparatus 400*c* of the wireless system 10 illustrated in FIG. 3 is preferably configured to perform the method 300.

The method comprises receiving 310 wireless transmissions 210*a*, 210*b*, . . . , 210*x* from multiple transmitters 200*a*, 200*b*, . . . , 200*x* at each of a plurality of antenna elements 110*a*, 110*b*, . . . , 110*y*. The wireless transmissions 210*a*, 210*b*, . . . , 210*x* comprise a respective identical copy of an information stream 201. As mentioned before, although each of the wireless transmissions 210*a*, 210*b*, . . . , 210*x* may be different, they all have a common component in the identical information stream 201. The receiving 310 may be performed in any suitable way, e.g. as detailed with reference to the receiver arrangement 120 of the present disclosure.

Figure 11:
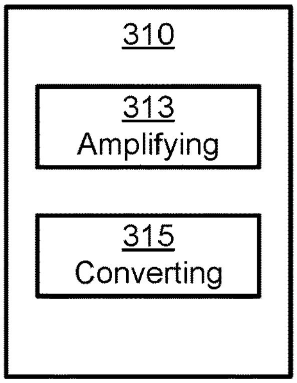
FIGS. 11 to 14 are block diagrams of specific parts of a method for receiver beamforming according to some embodiments of the present disclosure.

As illustrated in FIG. 11, the receiving 310 of the wireless transmissions 210*a*, 210*b*, . . . , 210*x* from multiple transmitters 200*a*, 200*b*, . . . , 200*x* may further comprise converting 315 the received antenna signals 111*a*, 111*b*, . . . , 111*y* into a corresponding digital representation of the received antenna signals 111*a*, 111*b*, . . . , 111*y*. The converting 315 may be performed in any suitable way e.g. as described in conjunction with the ADC 124 of FIG. 5 e.g. comprising frequency down-conversion and/or anti-alias filtering.

The receiving 310 of the wireless transmissions 210*a*, 210*b*, . . . , 210*x* from multiple transmitters 200*a*, 200*b*, . . . , 200*x* may further comprise amplifying 313 the received antenna signals 111*a*, 111*b*, . . . , 111*y* into an amplified received antenna signals 111*a*, 111*b*, . . . , 111*y*. The amplifying 313 may be performed in any suitable way e.g. as detailed with reference to LNA 122 of FIG. 5.

Returning to FIG. 10, the method 300 further comprises phase-shifting 320, for each antenna element 110*a*, 110*b*, . . . , 110*y*, the received antenna signals 111*a*, 111*b*, . . . , 111*y*. The phase-shifting 320 is performed in relation to multiple beam directions $b_a$, $b_b$, . . . , $b_x$. The phase-shifting provides phase-shifted antenna signals 120*a*$_1$, 120*a*$_2$, . . . , 120*a*$_x$, . . . , 120*n*$_1$, 120*n*$_2$, . . . , 120*n*$_x$ for one or more of the multiple transmitters 200*a*, 200*b*, . . . , 200*x*. Although the method 300 is described with many operations being performed for one or more of the multiple transmitters 200*a*, 200*b*, . . . , 200*x* these operations are preferably performed for two or more of the multiple transmitters 200*a*, 200*b*, . . . , 200*x*. The phase-shifting 320 may be performed in any suitable way e.g. as described with reference to the receiver arrangement 120 of FIG. 5 and/or the phase-shift arrangement 126 of FIG. 6

Figure 12:
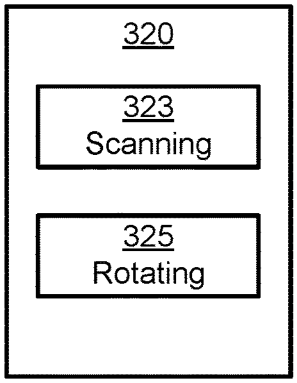

As seen in FIG. 12, the phase-shifting 320 comprises phase rotating 325 the received antenna signals 111*a*, 111*b*, . . . , 111*y* by the predetermined or configurable phase-shift $\phi_1$, $\phi_2$, . . . , $\phi_N$. The phase rotating 325 may be performed in any suitable way e.g. as described with reference to the phase-shift arrangement 126 of FIG. 6

With continued reference to FIG. 12, the method 300 may further comprise beam scanning 323, or scanning for short, to determine the configurable phase-shift $\phi_1$, $\phi_2$, . . . , $\phi_N$. The beam scanning 323 may be performed in any suitable e.g. as exemplified in the present disclosure.

FIG. 10 further illustrates that the method 300 comprises combining 330 the phase-shifted antenna signals 120*a*$_1$, 120*a*$_2$, . . . , 120*a*$_x$, . . . , 120*n*$_1$, 120*n*$_2$, . . . , 120*n*$_x$ for the one or more of the multiple transmitters 200*a*, 200*b*, . . . , 200*x*. The combining 330 provide a received beam signals 131*a*, 131*b*, . . . , 131*x* for each of the one or more of the multiple transmitters 200*a*, 200*b*, . . . 200*x*. The combining 330, may be performed in any suitable way, e.g. as detailed by the description of the first combiner 130 of FIG. 4.

Figure 13:
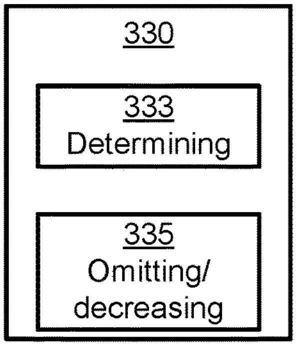

The combining 330 may, as shown in FIG. 13, further comprise determining 333 a phase-shifted antenna signal SNR $bSNRa_1$, $bSNRa_2$, . . . , $bSNRa_x$, . . . , $bSNRn_1$, $bSNRn_2$, . . . , $bSNRn_x$ for one or more of the phase-shifted antenna signals 120*a*$_1$, 120*a*$_2$, . . . , 120*a*$_x$, . . . , 120*n*$_1$, 120*n*$_2$, . . . , 120*n*$_x$. This may be done as described with reference to the first combiner 130 of FIG. 4 or FIG. 7. The method 300 may further comprise, responsive to the phase-shifted antenna signal SNR $bSNRa_1$, $bSNRa_2$, . . . , $bSNRa_x$, . . . , $bSNRn_1$, $bSNRn_2$, . . . , $bSNRn_x$, being below a phase-shifted antenna signal SNR threshold, omitting 335, as previously presented, the associated phase-shifted antenna signals 120$a_1$, 120$a_2$, . . . , 120$a_x$, . . . , 120$n_1$, 120$n_2$, . . . , 120$n_x$ from the received beam signals 131*a*, 131*b*, . . . , 131*x* and/or decreasing 335 the weight of the phase-shifted antenna signals 120$a_1$, 120$a_2$, . . . , 120$a_x$, . . . , 120$n_1$, 120$n_2$, . . . , 120$n_x$ associated with the phase-shifted antenna signal SNR $bSNRa_1$, $bSNRa_2$, . . . , $bSNRa_x$, . . . , $bSNRn_1$, $bSNRn_2$ being below the phase-shifted antenna signal SNR threshold. This is beneficial as a too low phase-shifted antenna signal SNR $bSNRa_1$, $bSNRa_2$, . . . , $bSNRa_x$, . . . , $bSNRn_1$, $bSNRn_2$, . . . , $bSNRn_x$ will add noise rather than signal strength to the phase-shifted antenna signals 120$a_1$, 120$a_2$, . . . , 120$a_x$, . . . , 120$n_1$, 120$n_2$, . . . , 120$n_x$.

As seen in FIG. 10, the method 300 further comprises combining 340 the received beam signals 131*a*, 131*b*, . . . , 131*x*. This will provide a combined receive signal 141. The combining 340 may per performed in any suitable way, e.g. as described with reference to the second combiner 140 of FIG. 8.

Figure 14:
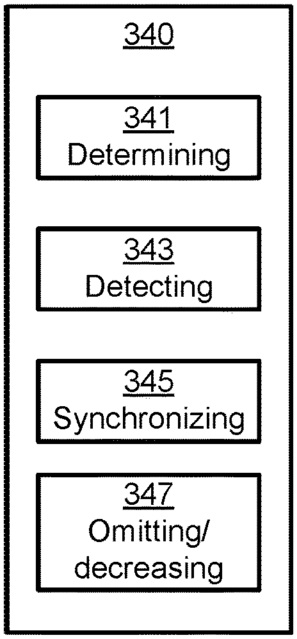

As seen in FIG. 14, the combining 340 may further comprise synchronizing 345 the received beam signals 131*a*, 131*b*, . . . , 131*x* with regards to a time and/or a phase difference between the received beam signals 131*a*, 131*b*, . . . , 131*x*. This may be done in any suitable way e.g. as disclosed with reference to the synchronizer 143 of FIGS. 8 and 9. In embodiments wherein one or more of the wireless transmissions 210*a*, 210*b*, . . . , 210*x* comprises a synchronization signal 203, the combining 340 may further comprise detecting 343 the synchronization signal 203. In these embodiments, the synchronizing 345 of the received beam signals 131*a*, 131*b*, . . . , 131*x* may be performed based on the detected synchronization signal 203.

With continued reference to FIG. 14, the combining 340 may further comprise determining 341 a transmitter SNR tSNRa, tSNRb, . . . , tSNRx of one or more of the received beam signals 131*a*, 131*b*, . . . , 131*x*. This may be performed in any suitable way e.g. as described with reference to the second combiner 140 of FIG. 4. The determined transmitter SNR tSNRa, tSNRb, . . . , tSNRx may be provided/prepared for subsequent communication to other devices and/or processes. It should be mentioned that the determining 341 a transmitter SNR tSNRa, tSNRb, . . . , tSNRx may be part of the combining 330 and performed e.g. by the first combiner 130. Optionally, if the transmitter SNR tSNRa, tSNRb, . . . , tSNRx is below a transmitter SNR threshold for one or more of the received beam signals 131*a*, 131*b*, . . . , 131*x*, the combining 340 may further comprise, as previously presented, omitting 347 that one or more of the received beam signals 131*a*, 131*b*, . . . , 131*x* from the combined receive signal 141 and/or, as previously presented, decreasing 347 the weight of the received beam signal 131*a*, 131*b*, . . . , 131*x* associated with the transmitter SNR tSNRa, tSNRb, . . . , tSNRx being below the transmitter SNR threshold. This may be implemented in any suitable way e.g. as described with reference to the second combiner 140 of FIG. 8.

Referring again to FIG. 10, the method 300 may further comprise determining 350 a receive signal SNR rSNR of the combined receive signal 141. The receive signal SNR rSNR may be provided to e.g. a system controller 15 and/or other entities. The method 300 may further comprise comparing the determined receive signal SNR rSNR the receive signal SNR threshold as presented herein, e.g. when describing the second combiner 140. The method 300 may further comprise omitting one or more of the received beam signals 131*a*, 131*b*, . . . , 131*x* from the combining as presented herein, e.g. when describing the second combiner 140.

Figure 15:
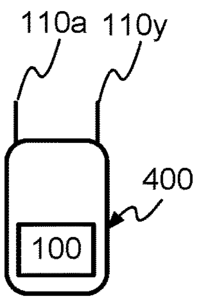
FIGS. 15 and 16 are schematic views of two different apparatuses according to some embodiments of the present disclosure.
Figure 16:
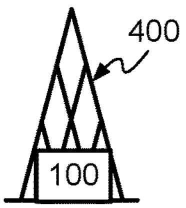

FIGS. 15 and 16 illustrate respective embodiment of apparatuses 400 comprising the receiver 100 as presented herein. The apparatuses 400 may comprise the antenna elements 110*a*, 110*b*, . . . , 110*y*. In FIG. 15, the apparatus is shown in the form of a wireless device 400, in some embodiments, the wireless device 400 is a user equipment (UE) 400. In FIG. 14, the apparatus 400 is shown in the form of a network node 400, in some embodiments the network node 400 is a base station (BS) 400. Regardless of embodiment, the apparatus 400 is configurable to perform, or cause the execution of, the method 300 as presented with reference to FIGS. 10 to 14.

Figure 17:
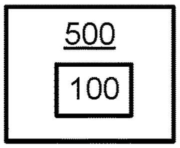
FIG. 17 is a schematic view of an integrated circuit according to some embodiments of the present disclosure.

With reference to FIG. 17, an integrated circuit (IC) 500 comprising the receiver 100 as presented herein is shown. The IC 500 may be an application specific IC (ASIC) and may be built on any suitable semiconductor process, e.g. CMOS etc. Regardless of embodiment, the IC 500 is configurable to perform, or cause the execution of, the method 300 as presented with reference to FIGS. 10 to 14.

Figure 18:
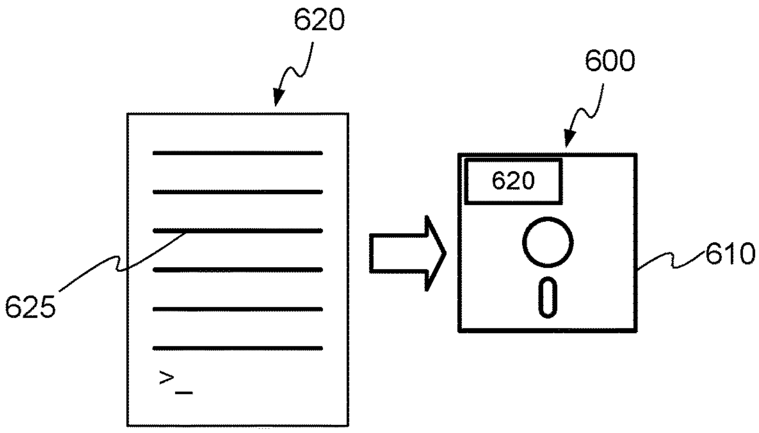
FIG. 18 is a schematic view of a computer program product according to some embodiments of the present disclosure.

In FIG. 18, a computer program 620 is schematically illustrated. The computer program 620 comprises program instructions 625. The computer program 620 may be stored onto a non-transitory computer readable medium 610 forming a computer program product 600. In FIG. 18, the non-transitory computer readable medium 610 is illustrated as a vintage 5.25" floppy drive, but any non-transitory computer readable medium forming a suitable carrier for the computer program 620 is applicable, e.g. a universal serial bus (USB) memory, a plug-in card, an embedded drive, a read only memory (ROM), a compact disc (CD) ROM etc.

Figure 19A:
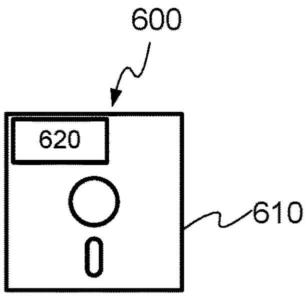
FIGS. 19*a-d* are schematic views of a computer program product according to some embodiments of the present disclosure.

The program instructions 625 of the computer program 620 are configured to cause, when executed by any form of data processing unit 800 (see FIG. 19*c*), execution of the method 300, or part of the method 300, as described herein with reference to e.g. FIGS. 10 to 15. In FIG. 19*a*, the computer program product 600 is illustrated stand alone as a passive device.

Figure 19B:
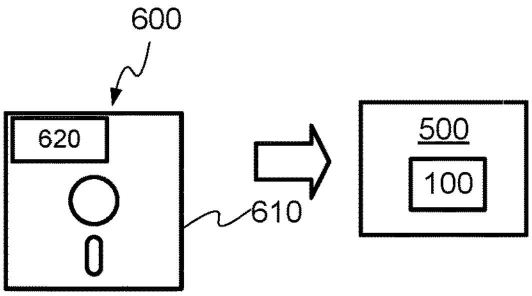

In FIG. 19*b*, it is illustrated that the computer program 620 may be loaded onto the IC 500 of the present disclosure, e.g. via embodiments of the computer program product 600.

Figure 19C:
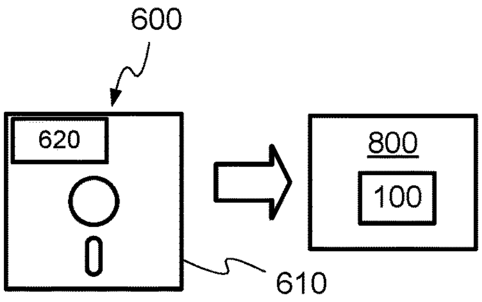

In FIG. 19*c*, it is illustrated that the computer program 620 may be loaded onto a data processing unit 800. The computer program 620 may loaded onto the data processing unit 800 by means of e.g. embodiments of the computer program product 600.

Figure 19D:
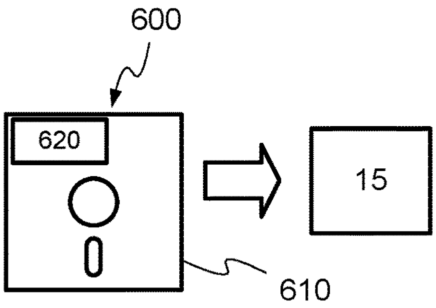

In FIG. 19*d*, it is illustrated that the computer program 620 may be loaded onto the system controller 15 as disclosed herein. The computer program 620 may loaded onto the system controller 15 by means of e.g. embodiments of the computer program product 600.

Figure 20A:
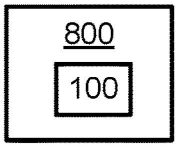
FIGS. 20*a-b* are schematic views of a data processing unit according to some embodiments of the present disclosure.
Figure 20B:
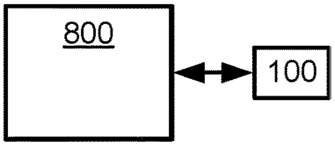
Figure 20C:
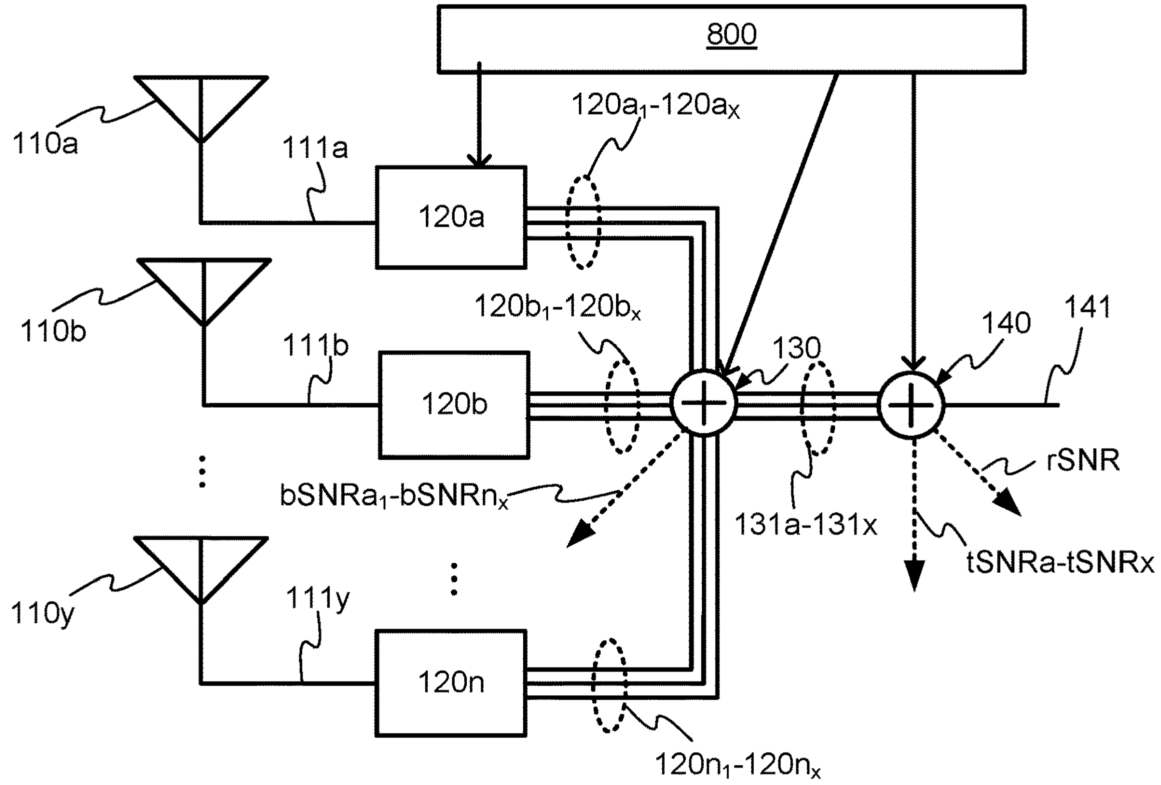
FIG. 20*c* is an alternative embodiment of the processing unit according to some embodiments of the present disclosure.

In FIG. 20*a*, the data processing unit is 800 is illustrated as comprising the receiver arrangement 100 of the present disclosure. In FIG. 20*b*, an alternative embodiment of the processing unit is illustrated wherein it is operatively connected to a receiver arrangement 100 as presented herein. In FIG. 20*c*, an alternative embodiment of the processing unit 800 is illustrated wherein it is operatively connected a plurality of receiver arrangement 120*a*, 120*b*, . . . , 120*n* each connected to one respective antenna element 110*a*, 110*b*, . . . , 110*y* of a plurality of antenna elements 110*a*, 110*b*, . . . , 110*y*. The processing unit 800 is further operatively connected to a first combiner 130 and a second combiner 140. In this embodiment, the data processing unit 800 may be configured to cause the execution of some or all steps of the method 300 as presented herein, e.g. with reference to FIGS. 10 to 14. Specifically, the processing unit 800 may be configured to cause the receiving of wireless transmissions 210*a*, 210*b*, . . . , 210*x* from multiple transmitters 200*a*, 200*b*, . . . , 200*x* at each of the plurality of antenna elements 110*a*, 110*b*, . . . , 110*y*. The wireless transmissions 210*a*, 210*b*, . . . , 210*x* comprise a respective identical copy of an information stream 201. The processing unit 800 may further be configured to cause phase-shifting of, for each antenna element 110*a*, 110*b*, . . . , 110*y*, the received antenna signals 111*a*, 111*b*, . . . , 111*y* in relation to multiple beam directions $b_a$, $b_b$, . . . , $b_x$, thereby causing provision of phase-shifted antenna signals 120$a_1$, 120$a_2$, . . . , 120$a_x$, . . . , 120$n_1$, 120$n_2$, . . . , 120$n_x$ for one or more of the multiple transmitters 200*a*, 200*b*, . . . , 200*x*. Although the data processing unit is 800 is described with many of the caused operation being performed for one or more of the multiple transmitters 200*a*, 200*b*, . . . , 200*x* these operations are preferably performed for two or more of the multiple transmitters 200*a*, 200*b*, . . . , 200*x*. In addition to this, the processing unit 800 may further be configured to cause combining of, for the one or more of the multiple transmitters 200*a*, 200*b*, . . . , 200*x*, the phase-shifted antenna signals 120$a_1$, 120$a_2$, . . . , 120$a_x$, . . . , 120$n_1$, 120$n_2$, . . . , 120$n_x$ thereby causing provision a received beam signal 131*a*, 131*b*, . . . , 131*x* for each of the one or more of the multiple transmitters 200*a*, 200*b*, . . . , 200*x*, and synchronizing of the received beam signals 131*a*, 131*b*, . . . , 131*x* with regards to a time and/or a phase difference between the received beam signals 131*a*, 131*b*, . . . , 131*x* and thereafter combining 340 of the received beam signals 131*a*, 131*b*, . . . , 131*x* thereby causing provision a combined receive signal 141.

Figure 21:
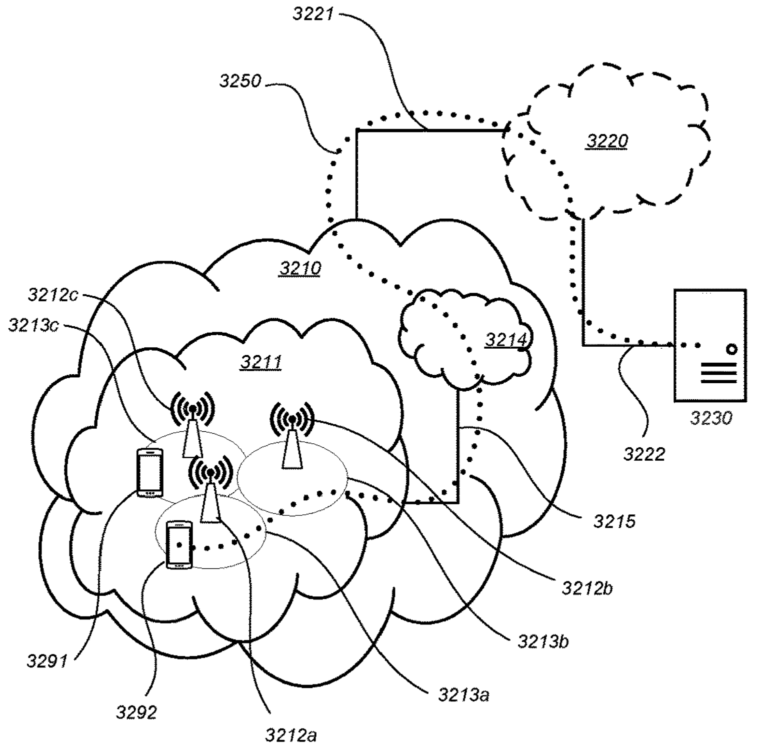
FIG. 21 schematically illustrates a telecommunication network connected via an intermediate network to a host computer.

With reference to FIG. 21, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 21 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 22. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 22) served by the base station 3320. The communication interface 3326 may be configured to facilitate a connection 3360 to the host computer 3310. The connection 3360 may be direct or it may pass through a core network (not shown in FIG. 22) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 22:
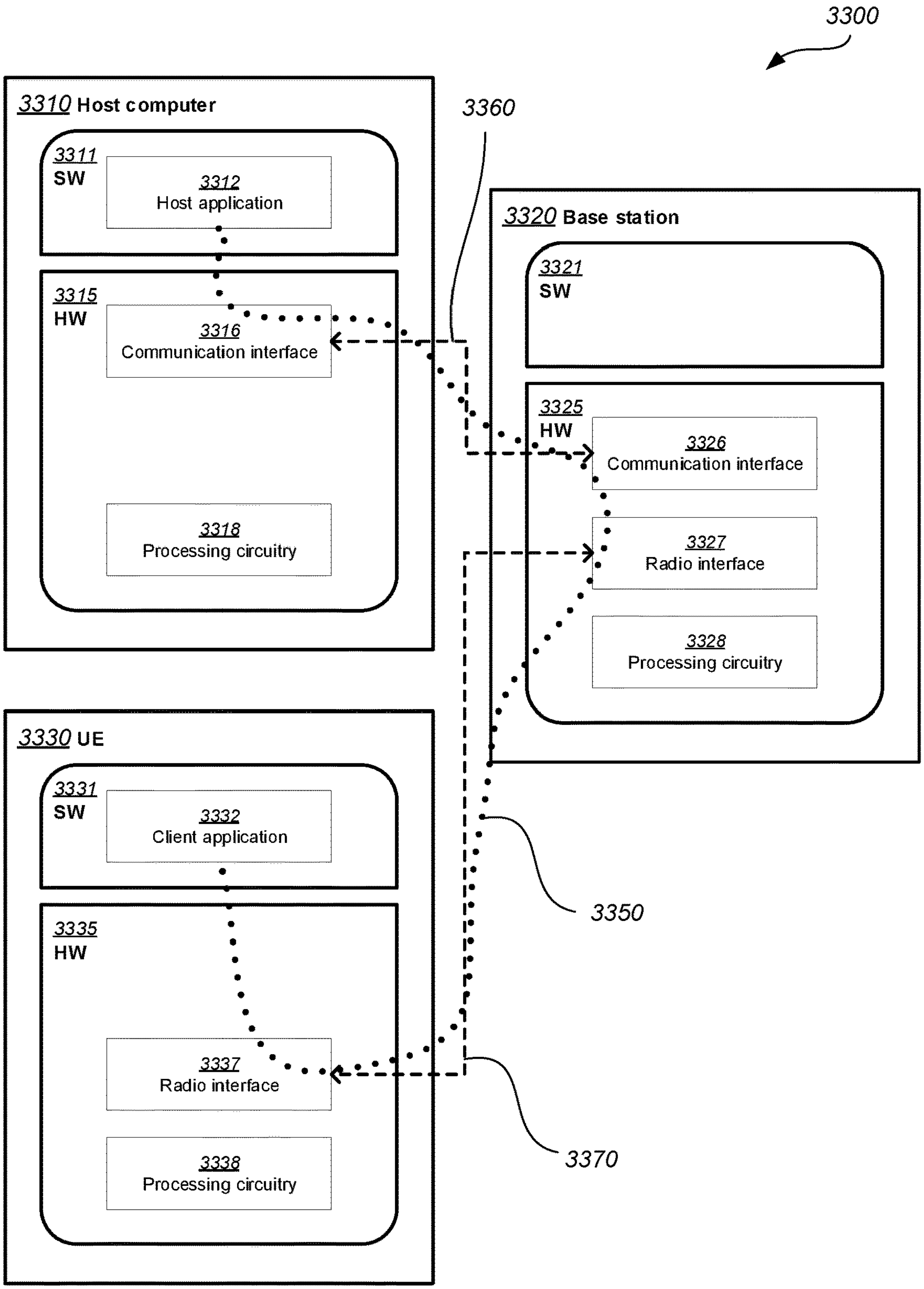
FIG. 22 is a generalized block diagram of a host computer communicating via a base station with a user equipment over a partially wireless connection.

It is noted that the host computer 3310, base station 3320 and UE 3330 illustrated in FIG. 22 may be identical to the host computer 3230, one of the base stations 3212*a*, 3212*b*, 3212*c* and one of the UEs 3291, 3292 of FIG. 21, respectively. This is to say, the inner workings of these entities may be as shown in FIG. 22 and independently, the surrounding network topology may be that of FIG. 21.

In FIG. 22, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the receiver SNR and thereby provide benefits such as extended range.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 23:
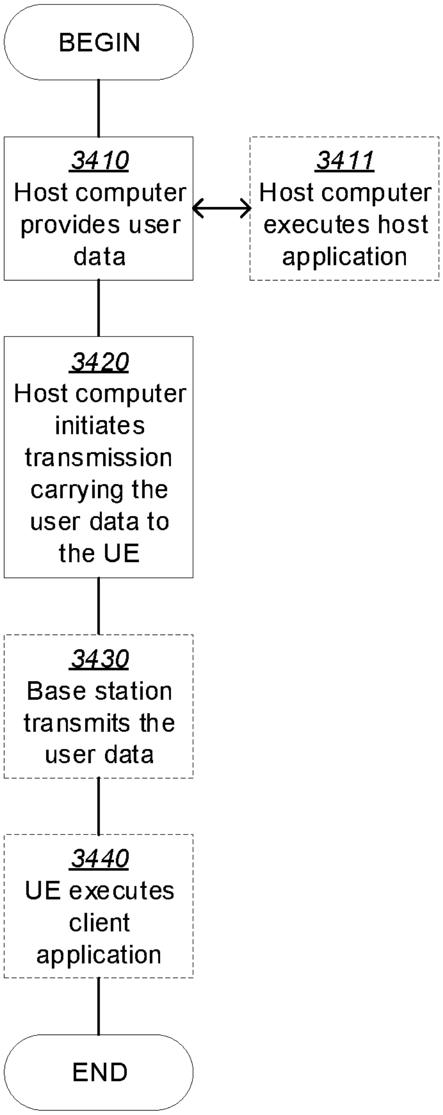
FIGS. 23 and 24 are flowcharts illustrating methods implemented in a communication system including a host computer, a base station and a user equipment.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 24:
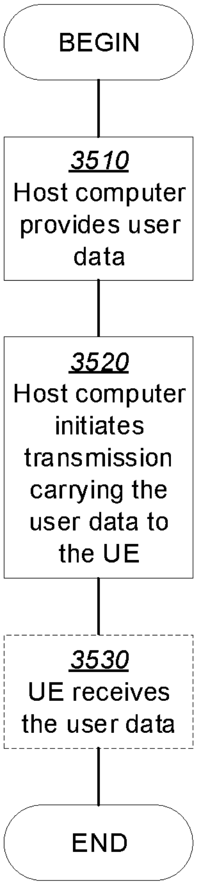

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while some embodiments of the invention have been described with reference to receivers in DMIMO systems, persons skilled in the art will appreciate that some embodiments of the invention may equivalently be applied to any other wireless communication standard. It should be emphasized that the present teachings are also suitable for e.g. LPWAN technology and UNB communications. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. Furthermore, although individual features may be included in different claims (or embodiments), these may possibly advantageously be combined, and the inclusion of different claims (or embodiments) does not imply that a combination of features is not feasible and/or advantageous. In addition, singular references do not exclude a plurality. Finally, reference signs in the claims are provided merely as a clarifying example and should not be construed as limiting the scope of the claims in any way.

Numbered Embodiments

1. A base station configured to communicate with a user equipment (UE), the base station comprising a radio interface and processing circuitry configured to communicate with a system controller of a wireless system comprising a plurality of base stations and to transmit wireless transmissions comprising a respective identical copy of an information stream as transmitted by the other of the plurality of base stations to the UE.

11. A method implemented in a base station forming part of a wireless system comprising a plurality of base stations, the method comprising receiving an indication of a receive signal SNR from a user equipment (UE), transmitting the receive signal SNR to a system controller of the wireless system, and transmit wireless transmissions comprising a respective identical copy of an information stream as transmitted by the other of the plurality of base stations to the UE.

21. A user equipment (UE) configured to communicate with a base station, the UE comprising a radio interface comprising a plurality of receiver arrangement (120*a*, 120*b*, . . . , 120*n*) each configured for connection to one respective antenna element (110*a*, 110*b*, . . . , 110*y*) of a plurality of antenna elements (110*a*, 110*b*, . . . , 110*y*), a first combiner (130) and a second combiner (140), wherein:

the receiver (100) is configurable to receive wireless transmissions (210*a*, 210*b*, . . . , 210*x*) from multiple transmitters (200*a*, 200*b*, . . . , 200*x*) at each of the plurality of antenna elements (110*a*, 110*b*, . . . , 110*y*), wherein the wireless transmissions (210*a*, 210*b*, . . . , 210*x*) comprise a respective identical copy of an information stream (201), each receiver arrangement (120*a*, 120*b*, . . . , 120*n*) of the plurality of receiver arrangements (120*a*, 120*b*, . . . , 120*n*) comprises a phase-shift arrangement (126) configurable to phase-shift the received antenna signals (111*a*, 111*b*, . . . , 111*y*) in relation to multiple beam directions ($b_a$, $b_b$, . . . , $b_x$), thereby providing phase-shifted antenna signals (120$a_1$, 120$a_2$, . . . , 120$a_x$, . . . , 120$n_1$, 120$n_2$, . . . , 120$n_x$) for two or more of the multiple transmitters (200*a*, 200*b*, . . . , 200*x*), the first combiner (130) is configurable to combine, for the two or more of the multiple transmitters (200*a*, 200*b*, . . . , 200*x*), the phase-shifted antenna signals (120$a_1$, 120$a_2$, . . . , 120$a_x$, . . . , 120$n_1$, 120$n_2$, . . . , 120$n_x$) thereby providing a received beam signal (131*a*, 131*b*, . . . , 131*x*) for each of the two or more of the multiple transmitters (200*a*, 200*b*, . . . , 200*x*), and the second combiner (140) comprises a synchronizer (143) configurable to synchronize the received beam signals (131*a*, 131*b*, . . . , 131*x*) with regards to a time and a phase difference between the received beam signals (131*a*, 131*b*, . . . , 131*x*) and the second combiner (140) is configurable to combine the received beam signals (131*a*, 131*b*, . . . , 131*x*) thereby providing a combined receive signal (141).

31. A method implemented in a user equipment (UE), comprising:

receiving (310) wireless transmissions (210*a*, 210*b*, . . . , 210*x*) from multiple transmitters (200*a*, 200*b*, . . . , 200*x*) at each of a plurality of antenna elements (110*a*, 110*b*, . . . , 110*y*), wherein the wireless transmissions (210*a*, 210*b*, . . . , 210*x*) comprise a respective identical copy of an information stream (201), phase-shifting (320), for each antenna element (110*a*, 110*b*, . . . , 110*y*), the received antenna signals (111*a*, 111*b*, . . . , 111*y*) in relation to multiple beam directions ($b_a$, $b_b$, . . . , $b_x$), thereby providing phase-shifted antenna signals (120$a_1$, 120$a_2$, . . . , 120$a_x$, . . . , 120$n_1$, 120$n_2$, . . . , 120$n_x$) for two or more of the multiple transmitters (200*a*, 200*b*, . . . , 200*x*), combining (330), for the two or more of the multiple transmitters (200*a*, 200*b*, . . . , 200*x*), the phase-shifted antenna signals (120$a_1$, 120$a_2$, . . . , 120$a_x$, . . . , 120$n_1$, 120$n_2$, . . . , 120$n_x$) thereby providing a received beam signal (131*a*, 131*b*, . . . , 131*x*) for each of the two or more of the multiple transmitters (200*a*, 200*b*, . . . , 200*x*), and synchronizing (345) the received beam signals (131*a*, 131*b*, . . . , 131*x*) with regards to a time and/or a phase difference between the received beam signals (131*a*, 131*b*, . . . , 131*x*) and combining (340) the synchronized received beam signals (131*a*', 131*b*', . . . , 131*x*') thereby providing a combined receive signal (141).

The invention claimed is:

1. A receiver, comprising:

a plurality of receiver arrangements, each receiver arrangement configured for connection to one respective antenna element of a plurality of antenna elements;

each receiver arrangement being configurable to receive wireless transmissions from multiple transmitters at each of the plurality of antenna elements;

each receiver arrangement of the plurality of receiver arrangements comprising a phase-shift arrangement configurable to phase-shift the received antenna signals in relation to multiple beam directions, thereby providing phase-shifted antenna signals for two or more of the multiple transmitters;

a first combiner being configurable to combine, for the two or more of the multiple transmitters, the phase-shifted antenna signals thereby providing a received beam signal for each of the two or more of the multiple transmitters; and a second combiner comprising a synchronizer configurable to synchronize the received beam signals with regards to a time and a phase difference between the received beam signals, the second combiner being configurable to combine the received beam signals thereby providing a combined receive signal, the second combiner being configurable to determine a transmitter signal to noise ratio (SNR) of each of the received beam signals.

2. The receiver according to claim 1, wherein each of the multiple beam directions corresponds to a predetermined or configurable phase-shift and the phase-shift arrangement is further configurable to phase rotate the received antenna signals with the predetermined or configurable phase-shift.

3. The receiver according to claim 1, wherein the phase-shift is a configurable phase-shift and the phase-shift arrangement is further configurable to perform beam scanning to determine the configurable phase-shift.

4. The receiver-according to claim 1, wherein the wireless transmissions comprises a synchronization signal and the synchronizer is further configurable to detect the synchronization signal and synchronize the received beam signals based on the detected synchronization signal.

5. The receiver according to claim 1, wherein each receiver arrangement of the plurality of receiver arrangements further comprises an analog to digital converter, ADC, configurable to convert the received antenna signals into a corresponding digital representation of the received antenna signals.

6. The receiver according to claim 1, further comprising a receive signal SNR device configurable to determine a receive signal SNR (rSNR) of the combined receive signal for subsequent communication.

7. The receiver according to claim 1, wherein the second combiner is further configured to, responsive to the transmitter SNR being below a transmitter SNR threshold, omit that one or more of the received beam signals from the combined receive signal.

8. The receiver according to claim 1, wherein the second combiner is further configured to perform a weighted combining of the received beam signals, and, responsive to the transmitter SNR being below a transmitter SNR threshold for one or more of the received beam signals, decrease a weight of that one or more of the received beam signals in the combined receive signal.

9. An apparatus comprising a receiver, the receiver comprising:

a plurality of receiver arrangements, each receiver arrangement configured for connection to one respective antenna element of a plurality of antenna elements;

each receiver arrangement being configurable to receive wireless transmissions from multiple transmitters at each of the plurality of antenna elements;

each receiver arrangement of the plurality of receiver arrangements comprising a phase-shift arrangement configurable to phase-shift the received antenna signals in relation to multiple beam directions, thereby providing phase-shifted antenna signals for two or more of the multiple transmitters;

a first combiner being configurable to combine, for the two or more of the multiple transmitters, the phase-shifted antenna signals thereby providing a received beam signal for each of the two or more of the multiple transmitters; and a second combiner comprising a synchronizer configurable to synchronize the received beam signals with regards to a time and a phase difference between the received beam signals, the second combiner being configurable to combine the received beam signals thereby providing a combined receive signal, the second combiner being configurable to determine a transmitter signal to noise ratio (SNR) of each of the received beam signals.

10. The apparatus of claim 9, further comprising the plurality of antenna elements.

11. The apparatus of claim 9, wherein the apparatus is a wireless device.

12. The apparatus of claim 9, wherein the apparatus is a network node.

13. A data processing unit, operatively connected to a plurality of receiver arrangements each connected to one respective antenna element of a plurality of antenna elements, a first combiner and a second combiner, the data processing unit being configured to cause:

receiving of wireless transmissions from multiple transmitters at each of the plurality of antenna elements;

phase-shifting of, for each antenna element, the received antenna signals in relation to multiple beam directions, thereby causing provision of phase-shifted antenna signals for two or more of the multiple transmitters;

combining of, for the two or more of the multiple transmitters, the phase-shifted antenna signals thereby causing provision a received beam signal for each of the two or more of the multiple transmitters;

synchronizing of the received beam signals with regards to one or both of a time and a phase difference between the received beam signals and combining of the received beam signals thereby causing provision of a combined receive signal; and determining a transmitter signal to noise ratio (SNR) of each of the received beam signals.

14. A method for receiver beamforming, the method comprising:

receiving wireless transmissions from multiple transmitters at each of a plurality of antenna elements;

phase-shifting, for each antenna element, the received antenna signals in relation to multiple beam directions, thereby providing phase-shifted antenna signals for two or more of the multiple transmitters;

combining, for the two or more of the multiple transmitters, the phase-shifted antenna signals thereby providing a received beam signal for each of the two or more of the multiple transmitters;

synchronizing the received beam signals with regards to one or both of a time and a phase difference between the received beam signals and combining the synchronized received beam thereby providing a combined receive signal; and determining a transmitter signal to noise ratio (SNR) of each of the received beam signals.

15. The method according to claim 14, wherein each of the multiple directions corresponds to a predetermined or configurable phase-shift and the phase-shifting comprises phase rotating the received antenna signals by the predetermined or configurable phase-shift.

16. The method according to claim 15, wherein the phase-shift is a configurable phase-shift and the phase-shifting further comprises beam scanning to determine the configurable phase-shift.

17. The method according to claim 14, wherein the wireless transmissions comprises a synchronization signal, wherein the combining the received beam signals further comprises detecting the synchronization signal, and wherein the synchronizing the received beam signals is performed based on the detected synchronization signal.

18. The method according to claim 14, wherein receiving the wireless transmissions further comprises, for each of the antenna element, converting the received antenna signals into a corresponding digital representation of the received antenna signals.

* * * * *